US008583593B1

(12) United States Patent
Achanta

(10) Patent No.: US 8,583,593 B1
(45) Date of Patent: Nov. 12, 2013

(54) SYSTEMS AND METHODS FOR OPTIMIZING DATABASE QUERIES

(75) Inventor: Venkat R. Achanta, Irvine, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 21 days.

(21) Appl. No.: 13/300,414

(22) Filed: Nov. 18, 2011

Related U.S. Application Data

(60) Division of application No. 13/043,793, filed on Mar. 9, 2011, now Pat. No. 8,065,264, which is a continuation of application No. 11/103,659, filed on Apr. 11, 2005, now Pat. No. 7,908,242.

(51) Int. Cl.
*G06F 17/30* (2006.01)

(52) U.S. Cl.
USPC ........................................................ 707/602

(58) Field of Classification Search
USPC ......... 707/602, 607, 640, 661, 759, 763, 769, 707/770, 803
See application file for complete search history.

(56) References Cited

U.S. PATENT DOCUMENTS

| 4,827,508 | A | 5/1989 | Shear |
| 4,868,570 | A | 9/1989 | Davis |
| 4,935,870 | A | 6/1990 | Burk, Jr. et al. |
| 5,247,575 | A | 9/1993 | Sprague et al. |
| 5,325,509 | A | 6/1994 | Lautzenheiser |
| 5,341,429 | A | 8/1994 | Stringer et al. |
| 5,528,701 | A | 6/1996 | Aref |
| 5,555,409 | A | 9/1996 | Leenstra, Sr. et al. |
| 5,640,551 | A | 6/1997 | Chu et al. |
| 5,655,129 | A | 8/1997 | Ito |
| 5,659,731 | A | 8/1997 | Gustafson |
| 5,666,528 | A | 9/1997 | Thai |
| 5,737,732 | A | 4/1998 | Gibson et al. |
| 5,768,423 | A | 6/1998 | Aref et al. |

(Continued)

FOREIGN PATENT DOCUMENTS

| EP | 0 419 889 | 4/1991 |
| EP | 0 458 698 | 11/1991 |

(Continued)

OTHER PUBLICATIONS

U.S. Appl. No. 12/705,489, filed Feb. 12, 2010, Bargoli et al.

(Continued)

*Primary Examiner* — Ajay Bhatia
*Assistant Examiner* — Fatima Mina
(74) *Attorney, Agent, or Firm* — Knobbe Martens Olson & Bear, LLP

(57) ABSTRACT

A relational database warehouse system with query optimization capabilities is described that allows for speedy identification of sets of records of interest from amongst tens of millions of records. The records of interest may include complex derived attributes, generated, at least in part, by aggregating data from a plurality of records in base data tables. In various embodiments, the query optimization capabilities allow the database warehouse system to identify conditions under which normal query execution may be replaced by one or more optimized execution methods, including, for example, eliminating unnecessary inner join operations on base data tables specified by a query, re-ordering the execution of group-by operations and left-outer join operations to greatly reduce the size of join tables produced while processing a query, and/or consolidating a set of segmentation queries for execution in one pass over the records of the database.

16 Claims, 11 Drawing Sheets

(56) References Cited

U.S. PATENT DOCUMENTS

| | | |
|---|---|---|
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,750 A | 10/1998 | Jou et al. |
| 5,822,751 A | 10/1998 | Gray et al. |
| 5,825,884 A | 10/1998 | Zdepski et al. |
| 5,835,915 A | 11/1998 | Carr et al. |
| 5,881,131 A | 3/1999 | Farris et al. |
| 5,893,090 A | 4/1999 | Friedman et al. |
| 5,905,985 A | 5/1999 | Malloy et al. |
| 5,963,932 A | 10/1999 | Jakobsson et al. |
| 6,073,140 A | 6/2000 | Morgan et al. |
| 6,121,901 A | 9/2000 | Welch et al. |
| 6,128,624 A | 10/2000 | Papierniak et al. |
| 6,144,957 A | 11/2000 | Cohen et al. |
| 6,151,601 A | 11/2000 | Papierniak et al. |
| 6,223,171 B1 | 4/2001 | Chaudhuri et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,869 B1 | 10/2001 | Moore et al. |
| 6,339,769 B1 | 1/2002 | Cochrane et al. |
| 6,366,903 B1 | 4/2002 | Agrawal et al. |
| 6,457,012 B1 | 9/2002 | Jatkowski |
| 6,496,819 B1 | 12/2002 | Bello et al. |
| 6,505,168 B1 | 1/2003 | Rothman et al. |
| 6,523,022 B1 | 2/2003 | Hobbs |
| 6,523,041 B1 | 2/2003 | Morgan et al. |
| 6,574,623 B1 | 6/2003 | Laung et al. |
| 6,651,220 B1 | 11/2003 | Penteroudakis et al. |
| 6,766,327 B2 | 7/2004 | Morgan, Jr. et al. |
| 6,804,701 B2 | 10/2004 | Muret et al. |
| 6,850,895 B2 | 2/2005 | Brodersen et al. |
| 6,934,714 B2 | 8/2005 | Meinig |
| 7,003,504 B1 | 2/2006 | Angus et al. |
| 7,028,052 B2 | 4/2006 | Chapman et al. |
| 7,050,989 B1 | 5/2006 | Hurt et al. |
| 7,082,435 B1 | 7/2006 | Guzman et al. |
| 7,185,016 B1 | 2/2007 | Rasmussen |
| 7,200,602 B2 | 4/2007 | Jonas |
| 7,240,059 B2 | 7/2007 | Bayliss et al. |
| 7,249,048 B1 | 7/2007 | O'Flaherty |
| 7,272,591 B1 | 9/2007 | Ghazal et al. |
| 7,277,900 B1 | 10/2007 | Ganesh et al. |
| 7,315,887 B1 * | 1/2008 | Liang et al. ............... 709/223 |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B2 | 5/2008 | Mayr et al. |
| 7,383,215 B1 | 6/2008 | Navarro et al. |
| 7,403,942 B1 | 7/2008 | Bayliss |
| 7,421,442 B2 | 9/2008 | Gelb et al. |
| 7,424,439 B1 | 9/2008 | Fayyad et al. |
| 7,467,127 B1 | 12/2008 | Baccash et al. |
| 7,475,118 B2 | 1/2009 | Leiba et al. |
| 7,483,842 B1 | 1/2009 | Fung et al. |
| 7,533,179 B2 | 5/2009 | Tarquini et al. |
| 7,536,346 B2 | 5/2009 | Aliffi et al. |
| 7,562,093 B2 | 7/2009 | Gelb et al. |
| 7,593,889 B2 | 9/2009 | Raines et al. |
| 7,668,840 B2 | 2/2010 | Bayliss et al. |
| 7,672,924 B1 | 3/2010 | Scheurich et al. |
| 7,672,926 B2 | 3/2010 | Ghazal et al. |
| 7,698,163 B2 | 4/2010 | Reed et al. |
| 7,707,059 B2 | 4/2010 | Reed et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,908,242 B1 | 3/2011 | Achanta |
| 7,912,865 B2 | 3/2011 | Akerman et al. |
| 7,983,932 B2 | 7/2011 | Kane |
| 7,991,901 B2 | 8/2011 | Tarquini et al. |
| 7,996,912 B2 | 8/2011 | Spalink et al. |
| 8,024,264 B2 | 9/2011 | Chaudhuri et al. |
| 8,065,264 B1 | 11/2011 | Achanta |
| 8,234,498 B2 | 7/2012 | Britti et al. |
| 8,271,378 B2 | 9/2012 | Chaudhuri et al. |
| 8,312,033 B1 | 11/2012 | McMillan |
| 8,321,952 B2 | 11/2012 | Spalink et al. |
| 8,463,919 B2 | 6/2013 | Tarquini et al. |
| 2001/0000536 A1 * | 4/2001 | Tarin ............... 707/102 |
| 2001/0037332 A1 | 11/2001 | Miller et al. |
| 2001/0039532 A1 | 11/2001 | Coleman, Jr. et al. |
| 2002/0010664 A1 | 1/2002 | Rabideau et al. |
| 2002/0010701 A1 * | 1/2002 | Kosciuszko et al. ......... 707/100 |
| 2002/0049738 A1 | 4/2002 | Epstein |
| 2002/0052884 A1 | 5/2002 | Farber et al. |
| 2002/0103809 A1 | 8/2002 | Starzl et al. |
| 2002/0133504 A1 | 9/2002 | Vlahos et al. |
| 2002/0138297 A1 | 9/2002 | Lee |
| 2002/0173984 A1 | 11/2002 | Robertson et al. |
| 2002/0184255 A1 | 12/2002 | Edd et al. |
| 2003/0018549 A1 | 1/2003 | Fei et al. |
| 2003/0041050 A1 | 2/2003 | Smith et al. |
| 2003/0050882 A1 | 3/2003 | Degen et al. |
| 2003/0083893 A1 | 5/2003 | Aliffi et al. |
| 2003/0097380 A1 | 5/2003 | Mulhern et al. |
| 2003/0171942 A1 | 9/2003 | Gaito |
| 2003/0191731 A1 | 10/2003 | Stewart et al. |
| 2003/0212654 A1 | 11/2003 | Harper et al. |
| 2004/0128150 A1 | 7/2004 | Lundegren |
| 2004/0128229 A1 | 7/2004 | Raines et al. |
| 2004/0153448 A1 | 8/2004 | Cheng et al. |
| 2004/0220896 A1 | 11/2004 | Finlay et al. |
| 2004/0221043 A1 | 11/2004 | Su et al. |
| 2004/0225596 A1 | 11/2004 | Kemper et al. |
| 2004/0230534 A1 | 11/2004 | McGough |
| 2004/0243588 A1 | 12/2004 | Tanner et al. |
| 2005/0010513 A1 | 1/2005 | Duckworth et al. |
| 2005/0086579 A1 * | 4/2005 | Leitner et al. ............ 715/500 |
| 2005/0137899 A1 | 6/2005 | Davies et al. |
| 2005/0154664 A1 | 7/2005 | Guy et al. |
| 2005/0177397 A1 | 8/2005 | Kane |
| 2005/0187948 A1 | 8/2005 | Monitzer et al. |
| 2005/0246338 A1 * | 11/2005 | Bird ................... 707/9 |
| 2005/0262158 A1 | 11/2005 | Sauermann |
| 2006/0036543 A1 | 2/2006 | Blagg et al. |
| 2006/0074991 A1 | 4/2006 | Lussier et al. |
| 2006/0149674 A1 | 7/2006 | Cook et al. |
| 2006/0184585 A1 | 8/2006 | Grear et al. |
| 2006/0195688 A1 | 8/2006 | Drissi et al. |
| 2006/0277092 A1 * | 12/2006 | Williams ................ 705/10 |
| 2006/0294199 A1 | 12/2006 | Bertholf |
| 2007/0011020 A1 | 1/2007 | Martin |
| 2007/0067437 A1 | 3/2007 | Sindambiwe |
| 2007/0226093 A1 | 9/2007 | Chan et al. |
| 2007/0282730 A1 | 12/2007 | Carpenter et al. |
| 2008/0059224 A1 | 3/2008 | Schechter |
| 2008/0059449 A1 | 3/2008 | Webster et al. |
| 2008/0255975 A1 | 10/2008 | Chaudhuri et al. |
| 2008/0301016 A1 | 12/2008 | Durvasula et al. |
| 2008/0320575 A1 | 12/2008 | Gelb et al. |
| 2009/0018996 A1 | 1/2009 | Hunt et al. |
| 2009/0024505 A1 | 1/2009 | Patel et al. |
| 2009/0048877 A1 | 2/2009 | Binns et al. |
| 2009/0106846 A1 | 4/2009 | Dupray et al. |
| 2009/0112650 A1 | 4/2009 | Iwane |
| 2009/0234665 A1 | 9/2009 | Conkel |
| 2010/0185546 A1 | 7/2010 | Pollard |
| 2010/0268660 A1 | 10/2010 | Ekdahl |
| 2011/0178899 A1 | 7/2011 | Huszar |
| 2011/0184838 A1 | 7/2011 | Winters et al. |

FOREIGN PATENT DOCUMENTS

| | | |
|---|---|---|
| EP | 0 559 358 | 9/1993 |
| EP | 0 977 128 | 2/2000 |
| EP | 0 772 836 | 12/2001 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |

(56) References Cited

FOREIGN PATENT DOCUMENTS

| | | |
|---|---|---|
| WO | WO 99/17225 | 4/1999 |
| WO | WO 99/17226 | 4/1999 |
| WO | WO 99/38094 | 7/1999 |
| WO | WO 00/04465 | 1/2000 |
| WO | WO 00/28441 | 5/2000 |

OTHER PUBLICATIONS

U.S. Appl. No. 12/705,511, filed Feb. 12, 2010, Bargoli et al.

"Intelligent Miner Applications Guide"; Chapters 4-7; pp. 33-132; IBM Corp., Apr. 2, 1999.

"Parse", Definition from PC Magazine Encyclopedia, <http://www/pcmag.com/encyclopedia_term_0,2542,t=parse&i=48862,00.asp> as downloaded Mar. 5, 2012.

Elmasri et al., "Fundamentals of Database Systems, Third Edition (Excerpts)," pp. 253, 261, 268-70, 278-80, 585, 595, Jun. 2000.

Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", Amsterdam: North-Holland, 1955.

Klein, L.R; "The Keynesian Revolution", New York: MacMillan, 1947.

Smith, Wendell R., "Product Differentiation and Market Segmentation as Alternative Marketing Strategies", The Journal of Marketing, pp. 3-8, vol. XXI, The American Marketing Association, Brattleboro, Vermont, Jul. 1956.

Stone, "Linear Expenditure Systems and Demand Analysis: An Application to the Pattern of British Demand", The Economic Journal: The Journal of The Royal Economic Society, pp. 511-527, vol. LXIV, Macmillan & Co., London, Sep. 1954.

Various Posts from the <p2p.wrox.com> Forums: http://web.archive.org/web/2005045221950/http://p2p.wrox.com/topic.asp?TOPIC_ID=6513, dated Nov. 15, 2003-Oct. 7, 2004.

Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003.

Working, Holbrook, "Statistical Laws of Family Expenditure", Journal of the American Statistical Association, pp. 43-56, vol. 38, American Statistical Association, Washington, D.C., Mar. 1943.

International Search Report and Written Opinion for Application No. PCT/US09/60393, dated Dec. 23, 2009.

"D&B Corporate Family Linkage", D&B Internet Access for U.S. Contract Customers, https://www.dnb.com/ecomp/help/linkage.htm printed Dec. 17, 2009 in 1 page.

"Ficticious Business Name Records", Westlaw Database Directory, http://www.directoy.westlaw.com/scope/default.asp?db=FBN-ALL &RS-W&VR=2.0 printed Dec. 17, 2009 in 5 pages.

International Search Report and Written Opinion for Application No. PCT/US10/34434, dated Jun. 23, 2010.

"Name Availability Records", Westlaw Database Directory, http://www.directoy.westlaw.com/scope/default.asp?db=NA-ALL &RS=W&VR=2.0 printed Dec. 17, 2009 in 5 pages.

"PremierGuide Announces Release 3.0 of Local Search Platform", Business Wire, Mar. 4, 2004, Palo Alto, CA, p. 5574.

\* cited by examiner

SYSTEMS AND METHODS FOR OPTIMIZING DATABASE QUERIES

CROSS-REFERENCE TO RELATED APPLICATIONS

This application claims priority to and is a divisional of U.S. application Ser. No. 13/043,793, filed Mar. 9, 2011, which is a continuation of U.S. application Ser. No. 11/103,659, filed Apr. 11, 2005, now U.S. Pat. No. 7,908,242, each of which are hereby incorporated by reference in their entirety into this application.

FIELD OF THE INVENTION

The invention relates generally to the field of database query optimization and, more specifically, to optimizations for batched queries on views in data warehouses.

BACKGROUND OF THE INVENTION

Databases have evolved from simple file systems to massive collections of data serving a variety of users and numerous distinct applications. Online database systems may be configured to receive an ongoing stream of new and updated information, to update their records accordingly, and to allow for relatively small queries of the up-to-date data in real-time. A database warehouse is typically a storage facility for large amounts of data that allows for a more in-depth analysis of the data, using derived and/or aggregated information based on the data to identify groups of records within the database that share common characteristics, for example.

Some database warehouses are used for basic data that is relatively static over time. In such data warehouses, explicitly calculating additional data values that are derived and/or aggregated from the basic data, and dedicating disk space for the storage of the additional data values, may be justified if the data values are frequently used for responding to queries, and especially if the amount of data overall is not very large. However, when a data warehouse stores data that is frequently updated, and when queries to the data warehouse demand very up-to-date information, it is not always feasible to pre-calculate and store the derived and aggregated data. Instead, virtual tables, known as views, may be used to store formulas and instructions for calculating derived and aggregated data values from the basic data. When a query comes in, the view may be calculated on the fly in volatile memory using up-to-date data, and the view's data values may then be made available for responding to the query.

Although the use of views and other types of virtual tables reduces the need for disk storage space and allows for frequent updating of the data, when the data warehouse is used for storing massive amounts of data, calculating and using the views, which will also be huge, can be very taxing of the system's memory and processing resources. Furthermore, accessing and manipulating the massive views in memory in response to a query can take a prohibitively long amount of time.

These deficiencies are especially relevant for views that provide a comprehensive offering of basic and derived data from a massive data warehouse because such views are often generated, at least in part, by the execution of "join" operations between tables, either actual or virtual, that individually provide access to smaller portions of the data. Join operations are very expensive with respect to system memory and processing resources. In addition, the resulting view is typically much larger than either of the tables being joined, since it represents the Cartesian product of the original tables. Because of this, attempts have been made to design database optimization engines that automatically eliminate join operations when possible. However, improper elimination of "inner join" operations may produce incomplete or incorrect results. For any type of join, when the tables being joined comprise tens of millions of records, each of which may comprise thousands of attributes, managing temporary storage in memory, access, and manipulation of the data becomes extremely cumbersome. Complex queries submitted to the system may take many hours, or even more than a full day, to be completed, tying up system resources for the duration. Furthermore, once such a view is generated, reading the records of the view represents a significant processing operation.

SUMMARY OF THE INVENTION

A database warehouse system with query optimization capabilities is described that allows for speedy identification of sets of records of interest from amongst a large number of records, such as tens of millions of records or more. The records of interest may include complex derived data values that may be presented in a view for use by a query and that may be generated, at least in part, by aggregating data from a plurality of records in base data tables. Views that present comprehensive access to the base data and to derived data may be generated by performing one or more join operations between tables and/or views that individually present more narrow segments of the data warehouse. An aspect of the present invention involves the realization that, given appropriate conditions, which will be described below, an optimized version of a comprehensive view may be generated in response to a query, allowing for greatly reduced consumption of system resources and greatly increased response time for very large and complex queries.

In various embodiments, the query optimization capabilities allow the database warehouse system to identify situations in which normal query execution may be replaced by one or more optimized execution methods, including, for example, (i) eliminating unnecessary base data tables from inner join operations for views specified by a query, thereby significantly reducing the size of the view and the resources used to generate it, (ii) re-ordering the execution of group-by operations and left-outer join operations to greatly reduce the size of join tables and other views produced while processing a query, and/or (iii) consolidating a set of separate segmentation queries for execution to in one pass over the records of a view.

An embodiment of a database warehouse system with query optimization capabilities is described. The database warehouse system includes a computer-based storage system for data about a general population that stores the data logically as a plurality of base data tables. The database warehouse system also includes a plurality of virtual tables that comprise formulas and instructions for calculating data values which are based, at least in part, on the data in the base data tables. The data values for the virtual tables are calculated in memory when the virtual tables are used for executing a query. The plurality of virtual tables includes a virtual attribute table, with instructions for calculating data values that are based, at least in part, on data values in other virtual tables of the database warehouse system. The database warehouse system further includes a query management system that is configured to receive queries and to use the virtual attribute table in executing the queries. The query management system further includes computer-executable instructions that identify situations in which a variety of optimizations may be implemented for query processing using system resources with enhanced efficiency.

For example, one or more code modules may provide for an optimization that, in response to receiving a query with a set of attributes of interest from the virtual attribute table, analyzes the query to determine an efficient set of base tables that are used to calculate the attributes of interest. If one or more base tables in the computer-based storage system are excluded from the set, the data warehouse system may avoid executing inner join operations on the excluded tables, thereby avoiding the expenditure of time and system resources for these joins, also thereby generating a smaller and more efficient set of view data values from which to extract the query results The one or more code modules of the query management system may also provide for an optimization that, in response to receiving a query submitted for execution on a sub-population of interest that is below a threshold size with respect to the general population, performs left-outer join operations between a table defining the sub-population and each base data table used for the query. The left-outer join operations conceptually form a resultant set of abbreviated base tables. The data from the abbreviated base tables in turn is used to calculate abbreviated sets of data values for an associated set of virtual tables including the virtual attribute table for use in executing the query.

Furthermore, one or more code modules of the query management system also provide for an optimization that, in response to receiving a set of queries that define a set of mutually exclusive segments of the general population for which data is stored in the database warehouse system, combines the set of queries into a single query that parses through the virtual attribute table once, reading each record of the virtual attribute table and assigning each record to one of the mutually exclusive segments.

An embodiment of a method is described for optimizing the execution of queries on a virtual attribute table whose attribute values are based on data about a population stored in a plurality of base data tables of a relational database system. In response to receiving a query with attributes of interest, the method includes identifying base data tables storing data on which the attributes of interest are based and calculating a modified version of the virtual attribute table if a base table in the relational database does not store data on which any attribute of interest is based. In response to receiving a query to be executed on a sub-population of interest, if the subpopulation of interest is smaller in size than a threshold size relative to the population, the method includes generating abbreviated versions of the base tables, which include records only for the sub-population of interest, and generating an abbreviated version of the virtual attribute table, which includes only records for the sub-population of interest. In response to receiving a set of original queries that collectively divide a set of records in the virtual attribute table into mutually exclusive segments, the method includes combining the set of queries into a consolidated query that reads the records of the virtual attribute table once and divides the set of records into the mutually exclusive segments instead of reading the records of the virtual attribute table once for each of the original queries.

An embodiment of a method is described for optimizing execution of queries on a virtual attribute table whose attribute values are based on data about a population stored in a plurality of base data tables of a relational database system. In response to receiving a query with attributes of interest, the method comprises identifying base data tables, if any exist, that do not store data on which any attribute of interest is based, and eliminating inner join operations performed on the identified base data tables, if any exist.

An embodiment of a method of optimizing execution of a query on a relational database is described. The method comprises: comparing the size of a population of interest for the query with the size of a general population about whom data is stored in the relational database, and, based at least in part on results of the comparison, performing left-outer join operations on base tables associated with the query before generating virtual tables whose data values are derived, at least in part on data stored in the base tables.

An embodiment of a method is described for optimizing execution of a query on a view in a relational database. The method comprises identifying base tables in the relational database that do not hold data for calculating attributes from the view that form part of the query. The method further comprises eliminating inner join operations on the identified base tables when calculating the attributes that form part of the query.

An embodiment of a method of optimizing execution of a query on a relational database is described. The method comprises: identifying base tables in the relational database that hold data for calculating attributes that form part of the query, identifying base tables that do not hold data for calculating attributes that form part of the query; and performing join operations specified in the query using only base tables in the relational database that hold data for calculating attributes that form part of the query.

An embodiment of a method of optimizing execution of a query on a relational database is described. The method comprises: receiving a set of instructions to divide a set of records into mutually exclusive segments, and writing the set of instruction as a single CASE-type statement that reads each record from the set once and assigns the record to one of the mutually exclusive segments, in conformance with the instructions.

Neither this summary nor the following detailed description defines the invention. The invention is defined by the claims.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

DETAILED DESCRIPTION OF THE PREFERRED EMBODIMENT

Figure 1:
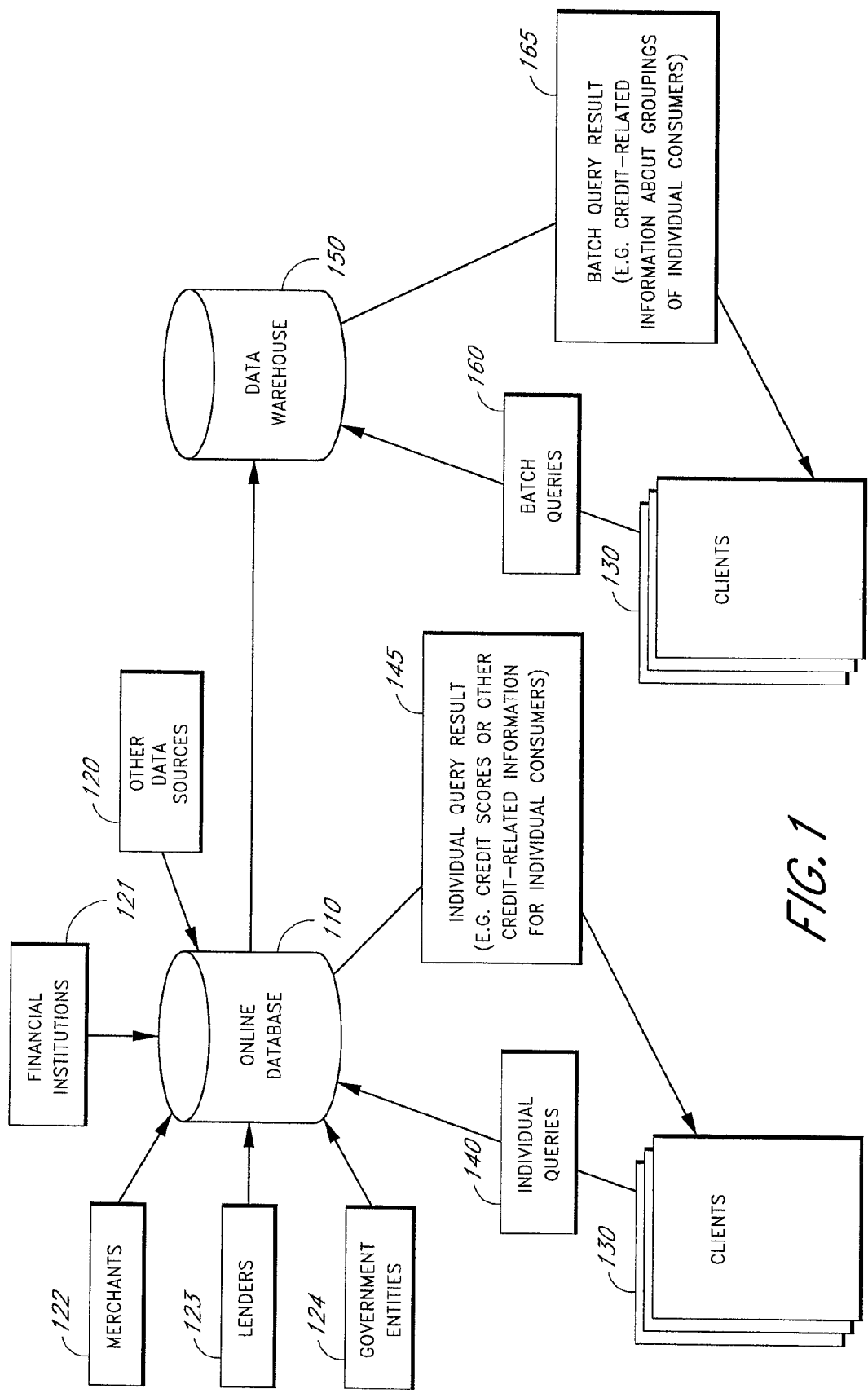
FIG. 1 is a block diagram depicting an overview of one embodiment of an online database and associated data warehouse system.

FIG. 1 is a block diagram depicting an overview of one embodiment of an online database 110 and associated data warehouse 150 system. As depicted in FIG. 1, an online database 110 may receive data input from a variety of sources 120-124. For example, a credit bureau may implement a system such as that depicted in FIG. 1 for maintaining credit-related information about consumer activities and may receive input regarding consumers from financial institutions 121, merchants 122, lenders 123, government entities 124, and other data sources 120. In other embodiments, other types of data may be stored in the online database 110 as provided by other types of data sources.

The online database 110 may be configured to receive, update, and store vast amounts of data. For example, in one embodiment, a credit bureau uses the online database 110 for storing credit-related data received from a variety of sources 120-124 for over thirty million consumers. Such data may include, for example, demographic information, credit-related information, and information available from public records. Some or all of the data may be used, among other purposes, to calculate credit scores for the consumers.

The online database 110 is typically configured to be able to quickly locate and return certain kinds of information, such as credit scores, about individual consumers, in response to requests for such information. Thus, clients 130, such as credit or loan providers and others interested in available information about a given consumer, may submit a query 140 to the online database 110 and may receive, in real-time or within a fairly short period of time, such as one or two hours, a result 145 for their query.

Many entities with interest in the data stored in the online database 110 may desire to perform a more in-depth analysis of the data, for example, searching the entire set of records to identify groups of interest from within the population for which data is stored. Credit providers and merchants, among others, may desire to make use of the consumer information stored in the online database 110 for a variety of other purposes, including identifying consumers with a specified set of attributes indicating that they may be potentially good customers and therefore suitable recipients of advertised offers. Identifying these consumers typically involves posing highly complex batch queries using attributes that may come directly from the stored data and/or attributes that may be derived from the stored data. For example, attributes that aggregate or summarize stored data are frequently useful for data analysis. Attributes that are derived by performing calculations or formulas on stored data may also be useful for analysis purposes.

In order to accommodate this more in-depth analysis, a data warehouse 150 may be maintained in association with the online database 110. While the online database 110 may be configured to receive incoming data on a constant basis, the data warehouse 150 stores a periodically updated copy of the data from the online database 110. For example, the data warehouse 150 may be updated monthly or weekly, or, in one embodiment, twice weekly, in order to provide very nearly up-to-date data for in-depth analysis. Furthermore, while the records of the online database 110 are configured to allow for quick response to individual queries 140, the data warehouse 150 is configured to receive batch queries 160 from clients 130 and to return batch query results 165. The batch queries 130 may involve the calculation of a wide array of complex, summarizing, and other derived data values based on the data received from the online database 110. Where the data warehouse 150 is used to store credit-related information about a population of consumers, the batch query 160 may involve calculating these complex data values for each member of a population of consumers. Because of the immensity of the data stored in the data warehouse 150, results for a query 160 of this sort may take upwards of twenty-four hours to be returned and may monopolize system resources during the interim.

As an alternative to credit-related information, the data warehouse system 150 and methods described herein may be used with a wide variety of other types of data, including financial, governmental, or scientific data, and may be used with other types of information retrieval systems. In particular, the system is useful for the storage and querying of vast amounts of data which is frequently updated and on which complex batch queries are executed.

Figure 2:
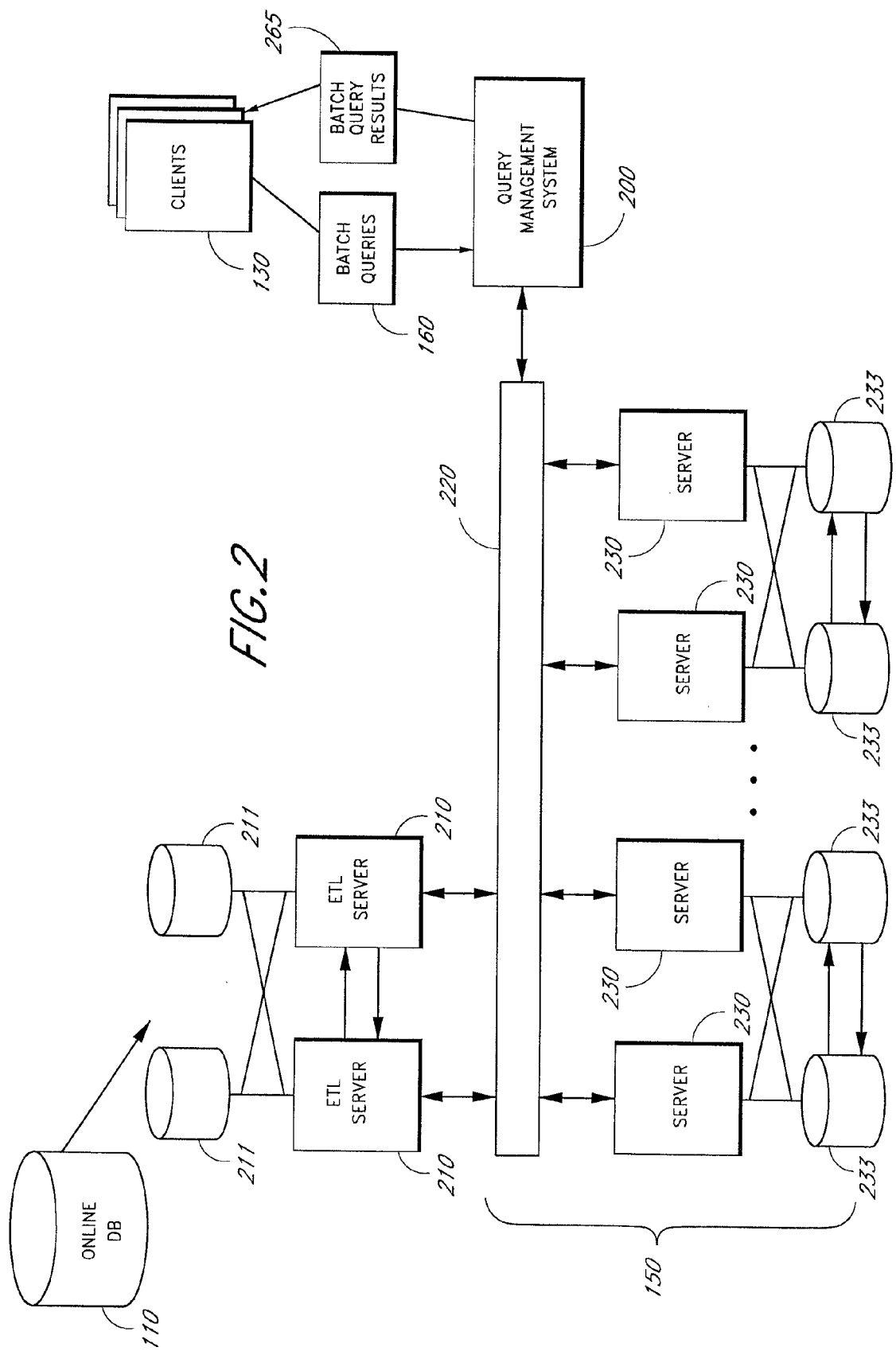
FIG. 2 is a block diagram depicting one embodiment of a data warehouse system configured to process queries submitted by a query management system.

FIG. 2 is a block diagram depicting a more detailed view of one embodiment of a data warehouse system 150 configured to process batch queries 160 submitted by a query management system 200. As depicted in FIG. 2, data from the online database 110 is processed by a set of ETL (Extract, Transform Load) servers 210 with associated storage capacity 211 before being transmitted to the data warehouse 150. As is known to practitioners of the art, ETL servers 210 provide functions involved with migrating data from one database format to another, often relying on rules, lookup tables, or combining the data with other data. Furthermore, the ETL servers 210 associated with the data warehouse 150 described herein perform additional functions related to data scrubbing, including detecting, removing, and/or correcting data that is incorrect, out-of-date, redundant, incomplete or formatted incompletely, amongst other deficiencies.

Once the data has been transformed by the ETL servers 210, the data is loaded to the data warehouse 150 by way of a high speed server interconnect switch 220 that handles incoming and outgoing communications with the data warehouse 150. In one example of the embodiment depicted in FIG. 2, the high speed interconnect switch 220 is an IBM SP2 switch. In other embodiments, Gig Ethernet, Infiniband, and other high speed interconnects may be used.

The server interconnect switch 220 forwards the scrubbed data to one or more data warehouse servers 230 with associated storage capacity 233. The hardware configuration outlined in FIG. 2 shows the data warehouse servers 230 connected in high-access pairs in order to increase reliable access to the data stored in the associated storage 233.

The embodiment of a data warehouse system 150 architecture described in FIG. 2 represents a Massively Parallel Processing (MPP) hardware infrastructure. In one embodiment, the servers 230 are IBM AIX pSeries servers (8-way p655), which act as the MPP building blocks of the data warehouse system 150. In other embodiments, other types of servers may act as the MPP building blocks of the system, for example, Linux servers, other types of UNIX servers, and/or Windows Servers. A similar architecture could also be implemented using Symmetric Multi-Processing (SMP) servers, such as IBM P690 32-way server or HP Superdome servers.

A relational database management system (RDBMS), such as a DB2 EEE8.1 system, manages the data in the data warehouse system 150. Partitioning capabilities associated with the RDBMS store the data across the storage disks 233 in a manner that enables independent processing of portions of a query by high-access pairs of servers 230, as will be described in greater detail with reference to FIG. 3A. Other database engines with suitable partitioning capabilities may also be used.

As further depicted in FIG. 2, a query management system 200 acts as an intermediary between the data warehouse 150 and clients 130. An example of such a system is provided by the Affinium campaign management products available from the Unica Corporation. Clients 130 submit batch queries 160 via a computer network to the query management system 200, which processes the queries 160, including, in some embodiments, by initiating some of the optimizations that will be described in detail below. The query management system 200 submits an application plan for executing the query 160 to the data warehouse 150 via the server interconnect switch 220 and receives back from the server interconnect switch 220 the batch query results 265, which the query management system 200 forwards to the client 130.

In FIG. 2, the query management system 200 is depicted as being a separate entity that communicates with the data warehouse system 150 via the high-speed interconnect switch 220 to pose queries that may be executed by the database management system of the data warehouse 150. In other embodiments, the functions of the query management system 200 may be integrated into those of the database management system in the data warehouse. Alternatively, the query management system 200 may be configured to provided functionality described herein as being performed by the database management system and may simply use the data warehouse system 150 as a repository of data on which to run queries. Thus, the data warehouse system 150 and the query management system 200 may, in various embodiments, be configured to communicate with one another as separate entities or as a unified entity, and may be located in the same location or remotely from one another.

In various embodiments, the data warehouse 150 architecture depicted in FIG. 2 may be exploited to provide enhanced distributed processing of queries 160 submitted to the system 150. In particular, when storage of the data is organized in a manner that allows pairs of servers 230 and their associated storage facilities 233 to work as independent units, each unit processing a portion of a query 160, overall performance can be greatly enhanced. One method of implementing such an organization is discussed with reference to FIGS. 3A and 3B below.

Figure 3A:
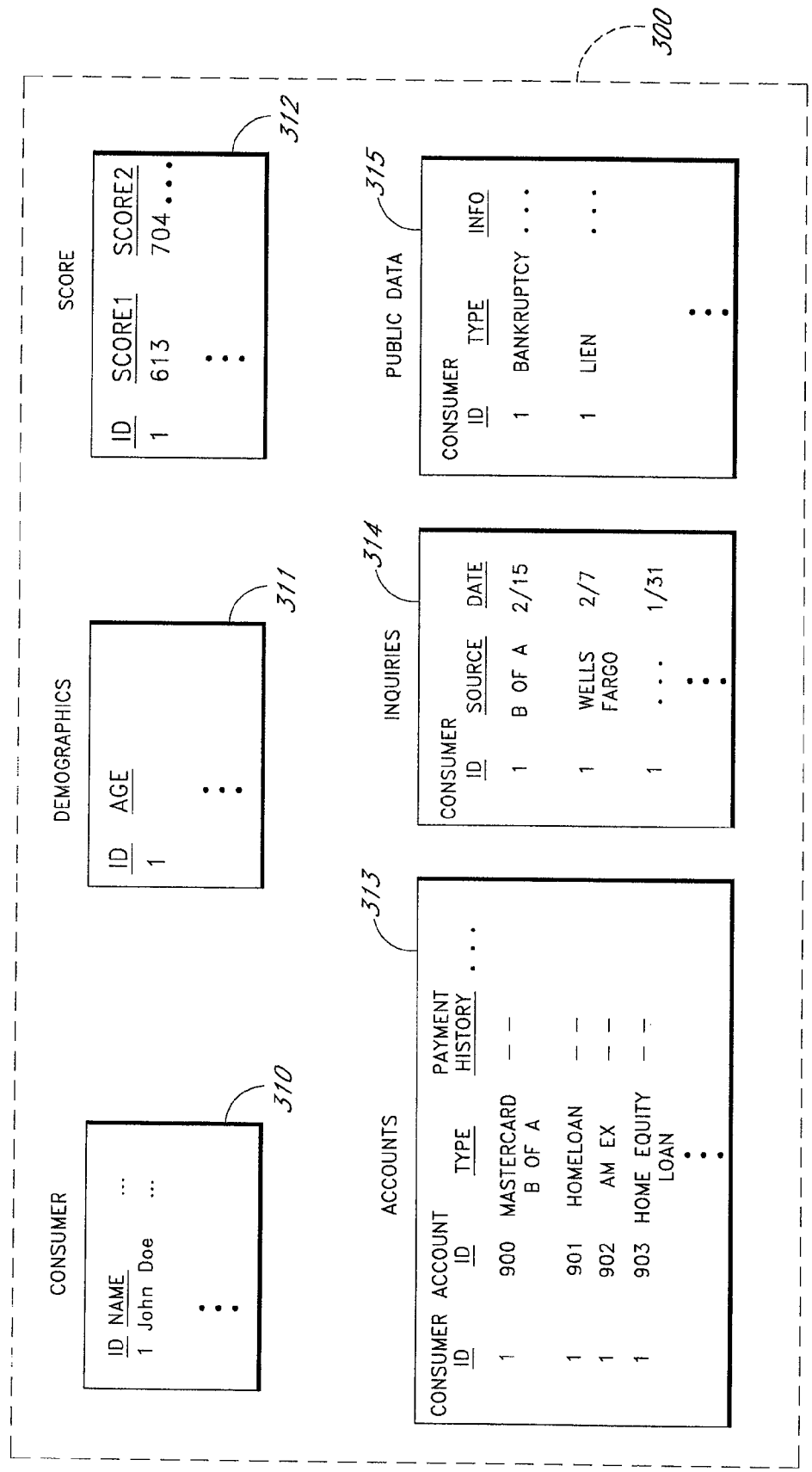
FIG. 3A depicts one example of a conceptual schema of logical base tables for storing data in the database warehouse.

FIG. 3A depicts one example of a conceptual schema 300 of logical base tables 310-315 for storing data in the database warehouse 150. As is well-known amongst practitioners in the field of relational databases, a schema 300 is a conceptual depiction of how data is stored in related tables 310-315, also known as relations. The example depicted for purposes of illustration is a schema 300 for storing information about credit-related activities of consumers. Schemas for holding different types of data, such as other financial, scientific, business, or any other type of data, or including different configurations of table relationships, may also be used with the data warehouse 150 and optimizations described herein.

In the example depicted in FIG. 3A, six tables 310-315 are shown. The tables 310-315 of FIG. 3A are referred to as "base data tables" or "base tables" because their data is stored on the storage disks 233 of the data warehouse system 150 and is basic to other data values generated by the data warehouse system 150. The data in the base tables 310-315 comprise, at least in part, core pieces of data received by the online database system 110 from the various input sources 120-124. As will be described in greater detail with reference to FIG. 4, other types of tables, called "virtual tables" or "views," in the data warehouse system 150 include formulas and instructions for generating data values that are typically not stored permanently in the data warehouse 150, but are calculated in memory, based at least in part on the base table data and used for processing a query 160.

A consumer table 310 stores basic identification information about individual consumers, including the consumer name and an identification number, which may be known as a PIN (personal identification number). Other information stored in the consumer table 310 may include current address and other contact information, date of birth, Social Security number, and many other pieces of identifying information. In one embodiment, the consumer table 310 includes one record, depicted as one row, per consumer. A demographics table 311 stores information about the consumers that allows for assigning the consumers to one or more of a variety of demographic groupings, such as age groupings, income level groupings, geographic groupings, education level groupings, and the like. The demographics table 311 includes one row per consumer. As can be seen in the sample demographics table 311, each row is associated with an identification number that relates the row to a row in the consumer table for the same consumer. A score table 312 stores one or more credit scores for each consumer. In the schema 300 depicted in FIG. 3A, each row of the score table 312 stores information pertaining to one consumer and can be related to the other tables 310-315 using the consumer identification number.

An accounts table 313 stores information about individual credit relationships, such as credit card accounts and loans of various sorts. As is briefly indicated in FIG. 3A, each record of the accounts table 313 includes information about a specific loan or account, for example, type of account, consumer associated with the account, current balance, average monthly balance, payment due date, number of late payments within a give time period, and so forth. An inquiries base table 314 includes information about credit-related queries 140 about consumers that have been posed to the online database 110, such as inquiries about a given consumer's current credit rating. A public data base table 315 includes information available from public records that is of relevance to consumer credit ratings. Two examples of information that may be stored in the public data base table 315 are information about consumer bankruptcies and information about liens in effect against a consumer.

Figure 3B:
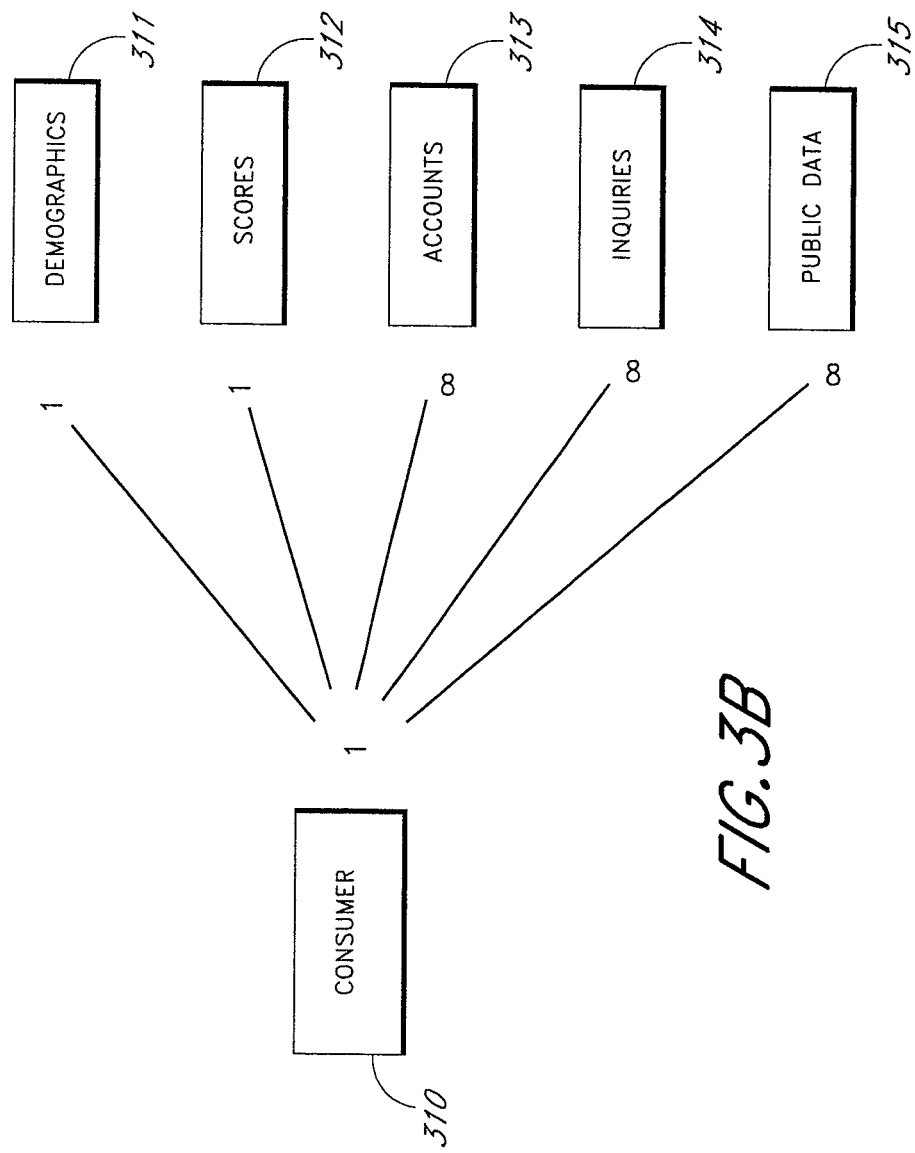
FIG. 3B depicts one embodiment of a set of cardinality ratios for the conceptual schema depicted in FIG. 3A.

FIG. 3B depicts one embodiment of a set of cardinality ratios for the conceptual schema 300 depicted in FIG. 3A. As depicted in FIG. 3B, the consumer base table 310 has a one-to-one relationship with the demographics base data table 311 and with the scores base data table 312, because each of these three tables 310-312 includes exactly one row per consumer in the population for whom data is stored in the data warehouse 150. Thus, the columns of these three tables 310-312 could, in theory, be easily aggregated to form one large table with information about individual consumers. Furthermore, in one embodiment of the schema 300, a condition known as bi-directional referential integrity (RI), is enforced for these three base data tables 310-312. As will be familiar to one of skill in the art, enforcing bi-directional RI on the consumer 310, demographics 311 and public data 312 base tables ensures that if one of the tables includes a records for a given consumer, as identified by PIN or other identification number, that the others of the three tables will include records for the same consumer, as well.

As is further depicted in FIG. 3B, the consumer base data table 310 has what is known as a one-to-many relationship with the accounts base data table 313, with the inquiries base data table 314, and with the public data base data table 315, indicating that each row (consumer) in the consumer table 310 may be related to many rows in, for example, the accounts table 313. To illustrate, one consumer may have two credit cards, one home mortgage, and one student loan, each of which is described in its own row in the accounts table 313. Or, the consumer may have no credit relationships and thus no records in the accounts table 313. Similarly, a consumer who is shopping around for a mortgage, may receive numerous credit inquiries within a given time period, and may be associated with any number, including zero, of public data listings, such as bankruptcies, liens, or title ownership transfers. In each case, each instance of the credit-related activity may occupy its own row in the associated table, and each consumer may be associated with a plurality of rows. Thus, we see that bi-directional RI is not necessarily enforced for these bases tables 313-315.

Although the base tables 310-315 are depicted in FIGS. 3A and 3B as being self-contained units, each maintaining a contiguous set of records for the population covered by the database system, in reality, as will be familiar to a practitioner of skill in the art, the tables 310-315 may be physically split up and stored in segments that are scattered throughout the storage capacity 233 of the data warehouse 150. Frequently, records of a table are divided amongst the storage disks 233 based on a value found in a selected field of the table, which is known as a partition key. Thus, all records of a table that have a given value in the field designated as the partition key may be stored on the same server/storage pair 230, 233.

In a preferred embodiment associated with the schema 300 depicted in FIGS. 3A and 3B, in order to facilitate independent processing by the pairs of data warehouse servers 230 and to minimize delays caused by excessive communications between separate pairs during processing of a query 160, records pertaining to a given set of consumers from some or preferably all of the base tables 310-315 are stored on a single pair of servers 230 with its associated storage facilities 233, thereby increasing system performance. This may be achieved by designating the ID field, which is present in each of the base tables 310-315 of the schema 300, as the partition key for all of the base tables 310-315. This allows all records related to a specific ID from all base tables 310-315 to be located on a single data partition, which in turn allows for efficient processing. Thus, each pair of servers 230 with storage 233 stores a portion of each of the base tables 310-315. In other embodiments, other systems and methods for physically storing data from base data tables may be used as deemed desirable by system designers. Performing the optimizations described herein on tables or other database structures that do not make use of the same partitioning key may involve data re-partitioning as part of the processing.

Figure 4:
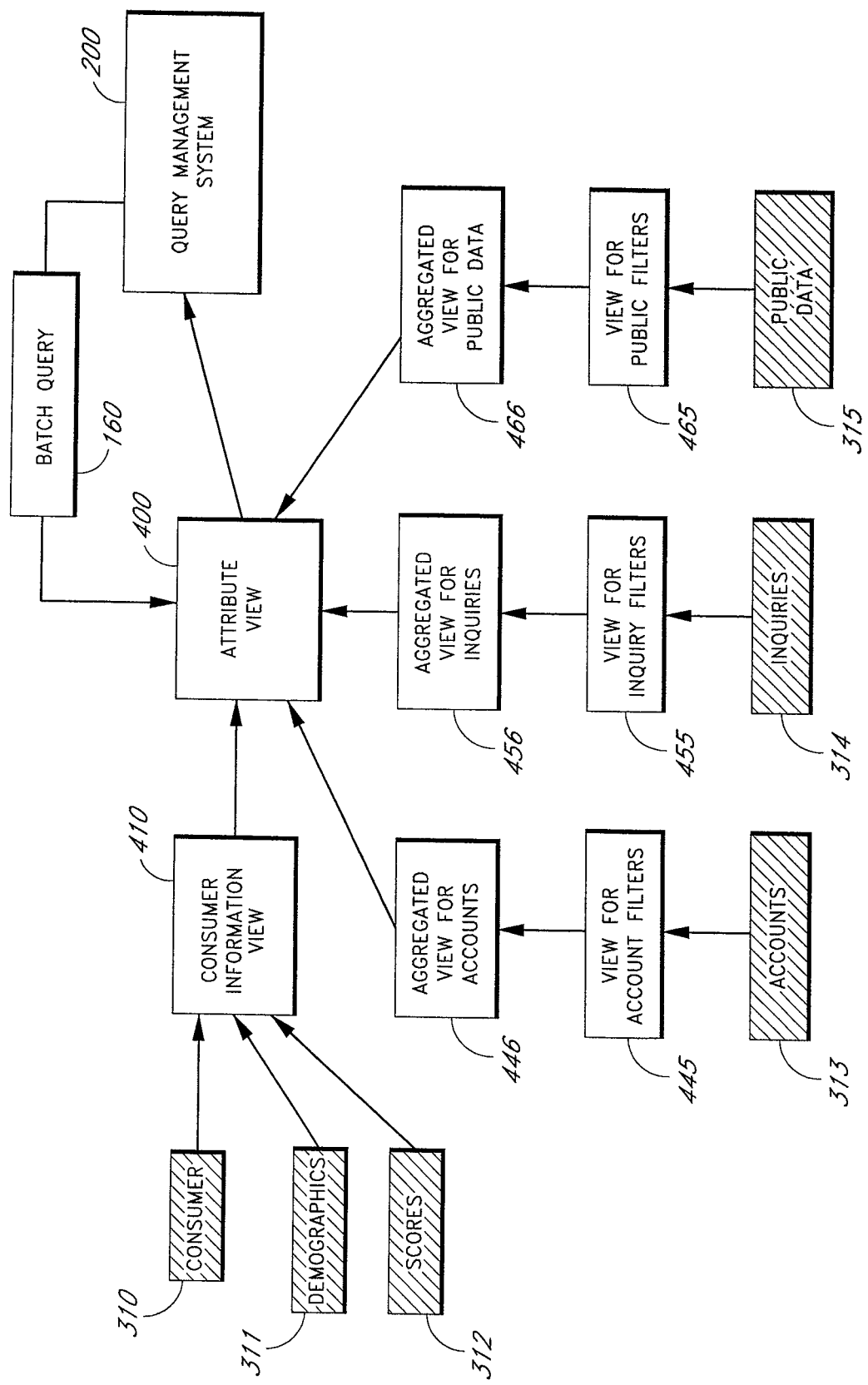
FIG. 4 is a block diagram that depicts one embodiment of a set of base data tables and associated views that are used in the data warehouse system to process a batch query received from the query management system.

FIG. 4 is a block diagram that depicts one example embodiment of a set of base data tables 310-315 and associated views 410, 445, 446, 455, 456, 465, 466 that are used in the data warehouse system 150 to process a batch query 160 received from the query management system 200.

In addition to the base tables 310-315 that store data for use by the query management system 200, the data warehouse system 150 comprises additional virtual tables, also known as "views," which are defined to include data copied directly from one or more of the base tables 310-315, as well as data values that are derived from data in one or more base tables 310-315 or other views. The data values of views are typically not stored on any permanent basis by the data warehouse system 150, and are instead calculated on an as-needed basis for responding to batch queries 160 posed by the query management system 200 on behalf of clients 130. Views are used to abstract complexity that is commonly a characteristic of physical data storage so that information can be presented to end clients in an understandable and usable format. As will be described below, views furthermore provide flexibility to define desired derived attributes and to calculate them on demand.

A "definition" or instruction set for generating the views is stored by the database management system and includes formulas, links, and other information that allows the data values of the views to be generated when needed. In particular, the definition of a view stores definitions of attributes, which can be visualized as the "columns" or fields of a flat file database. As an example, in the "Inquiries" base table 314 depicted in FIG. 3A, each record, or row, comprises three stored attributes, namely, Consumer ID, Source, and Date. A view associated with the Inquiries base table 314, might include, for purposes of illustration, the attributes "Personal ID Number (PIN)", "Date", and "Days Elapsed Since Inquiry." The view definition might indicate that the PIN attribute is the same as the Consumer ID attribute from the Inquiries table 314 (PIN.attr_view=ConsumerID.Inquiries), that the Date attribute in the view is the same as the Date in the base table 314 (Date.attr-view=Date.Inquiries), and that the "Days Elapsed Since Inquiry" attribute of the view can be calculated by subtracting the Date data value from the current calendar date, which can typically be determined from a computer's system clock (DaysElapsedSinceInquiry.attr_view=currentDate−Date. Inquiries). This last attribute is what may be called a "derived" attribute, because it can be calculated using a formula based, at least in part, on one or more base table attributes. Derived attributes may also be calculated using formulas that draw upon data from more that one base data table. The type of derived, or calculated, attributes described above, sometimes known as "filters," typically draw on data from various columns of a record in other tables or views.

In FIG. 4, a view for account filters 445, a view for inquiry filters 455, and a view for public filters 465 are each associated with a base data table, namely the accounts 313, inquiries 314, and public data 315 base tables, respectively. As indicated the arrows in FIG. 4, each of these views 445, 455, 465, includes derived attributes based data from the base table with which the view is associated. In the embodiment depicted in FIG. 4, in general, views for filters have the same number of rows as do the base tables with which they are associated. Although FIG. 4 presents a highly simplified depiction of the tables 310-315 and views of the data warehouse system 150, it should be noted that in various embodiments, the tables and views of the data warehouse system 150 include many, many attributes (columns) each, including some that are calculated with highly complex formulas, drawing from a large number of attributes from other tables and/or views.

Another kind of derived attribute, which may be called an "aggregated" attribute, is derived by performing an operation on one or more data values from the same column of another table or view. For example, looking again at the schema of FIG. 3A, an aggregated attribute based on the accounts base table 313 might be entitled "Number of Accounts." Aggregated data values are commonly generated, at least in part, using what are known as "Group By" operators for manipulating database values, which are named for their characteristic of aggregating data from sets of records that may be "grouped by" a certain common attribute. For example, in a view with the "Number of Accounts" attribute "grouped by" Consumer ID, the following record might appear:

| Consumer ID | Number of Accounts |
|---|---|
| 1 | 4 |

In FIG. 4, an aggregated view for accounts 446, an aggregated view for inquiries 456, and an aggregated view for public data 466, are views with aggregated derived attributes based on the view for filters 445, 455, 465 and the base tables 313, 314, 315 with which they are associated. While the base tables 313-315 and views for filters 445, 455, 465 may include more than one row for a given consumer, the aggregated views for accounts 446, inquiries 456, and public data 466 summarize the data so that they include at most one aggregated record per consumer.

The consumer information view 410, which is associated with base data tables 310-312 that are already configured to have at most one row per consumer, also includes at most one record per consumer. Because of the one-to-one cardinality ratio described with reference to FIG. B, the consumer information view 410 may be generated, at least in part, by performing inner join operations on the base tables 310-312. Furthermore, in embodiments in which bi-directional RI is enforced, as was described with reference to FIG. 3B, the three base tables 310-312 and the consumer information view 410 preferably all include exactly one record per consumer ID number.

In the example data warehouse organization that is depicted in FIG. 4, an attribute view 400, a very large virtual table which draws on data from the consumer information view 410 and the aggregated views 446, 456, 466, may be formed, at least in part, by performing left-outer join operations between the aforementioned views. Forming the attribute view 400 by performing a left-outer join between the consumer information view 410 and the aggregated views 446, 456, 466 ensures that the resulting attribute view 400 includes a record for each PIN number in the consumer information view 410, or, in one embodiment approximately thirty million records in all. Thus, the attribute view 400 provides a very comprehensive and unified view of the data in the data warehouse 150 for use by the query management system 200 on behalf of the clients 130.

The attribute view 400 stores attributes that draw, directly or indirectly, on data that may be stored in any of the base tables 310-315. A join operation between the aforementioned views conceptually inserts all the columns (attributes) from the individual aggregated views 410, 446, 456, 466 into the attribute view 400. In addition, the attribute view 400 may include a wide variety of additional attributes, including attributes that draw on data from more than one base table 310-315. In one embodiment of the data warehouse system described herein, the attribute view 400 comprises over three thousand attributes for every record (consumer). Thus, the attribute view 400 provides a catalog of pre-defined attributes, very simple to very complex, that may be of interest to clients for forming queries. Providing attributes in this single view to clients provides great flexibility and ease-of-use without forcing them to understand the physical storage of the data. However, in order to calculate the attributes of interest, views perform join operations, which, as been explained, are very expensive operations. Optimizations described herein help provide efficient execution plans for queries on the attribute view 400.

Some embodiments of the system may further allow for additional custom-defined attributes to be used in conjunction with the attribute view 400, which may be generated in a similar manner similar to that of the attribute view 400.

As with the base tables 310-315 described with reference to FIG. 3A, the attribute view 400, although depicted in FIG. 4 as a singular and unified entity, may, in various embodiments be configured as a plurality of virtual tables that may in combination provided the functionality described herein for the attribute view 400.

As further depicted in FIG. 4, the query management system 200, receives requests for information, based on data in the data warehouse 150, from clients 130 and formulates the requests as batch queries 160 executed on the attribute view 400.

Figure 5:
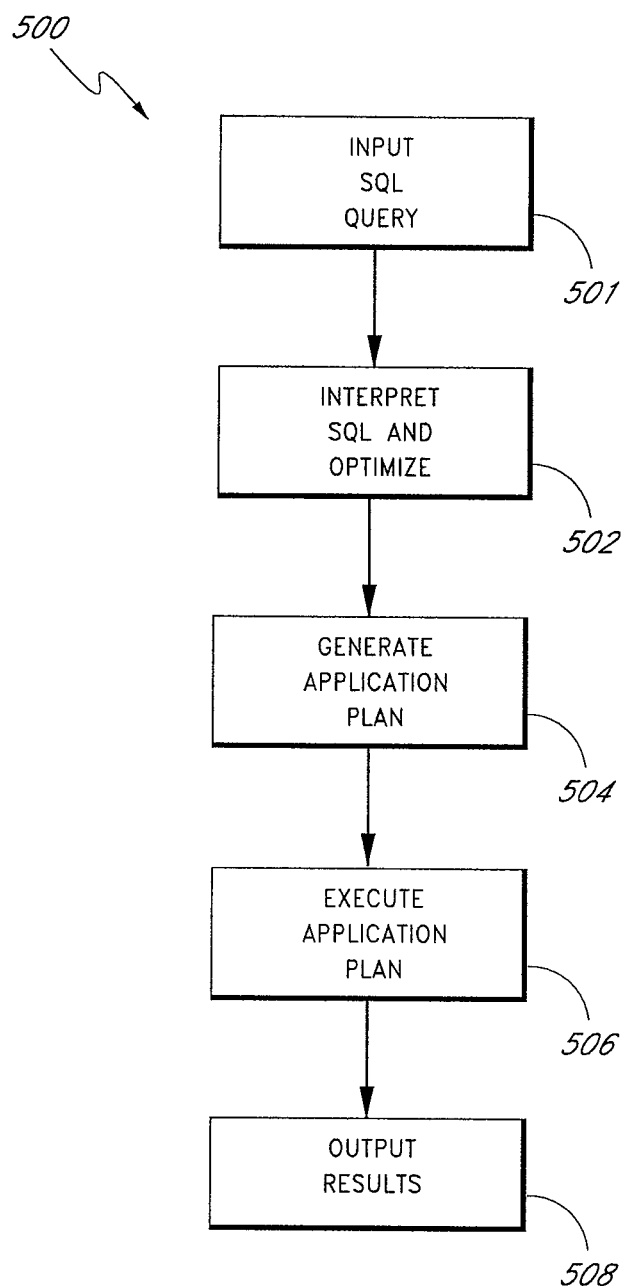
FIG. 5 is a flowchart depicting one embodiment of a process for processing a query.

FIG. 5 is a flowchart depicting one embodiment of a general overview of a process for executing a batch query 160. Block 501 represents the formulation of an information request received from a client 130 by the query management system 200 as a batch query 160 that comprises statements in a database query language, such as SQL, for execution on the data warehouse system 150.

Block 502 represents the tasks of compiling or interpreting the SQL statements and performing appropriate optimizations to the query 160. An optimization function within Block 502 transforms or optimizes the SQL query in a manner described in more detail with reference to FIGS. 6-7D to follow. Generally, the SQL statements received as input specify the desired data, but not how to retrieve the data. Thus, a part of this function may involve "drilling down" through the definition of various attributes, determining the formula, for example, of the attribute, and what the tables or views hold the components of the formula, and whether or not those components need to be further broken down into more basic data components, until the core data from the base tables 310-315 use d for the attribute is identifies. Block 502 considers both the available access paths to the desired data and system held statistics on the data to be accessed (the identity, size, and location of views and tables associated with the attributes used for responding to the query, etc.) to choose what it considers to be the most efficient access path for the query. Block 504 represents the act of generating a compiled set of runtime structures called an application plan from the compiled SQL statements. Block 506 represents the execution of the application plan and Block 505 represents the output of the results.

Figure 6:
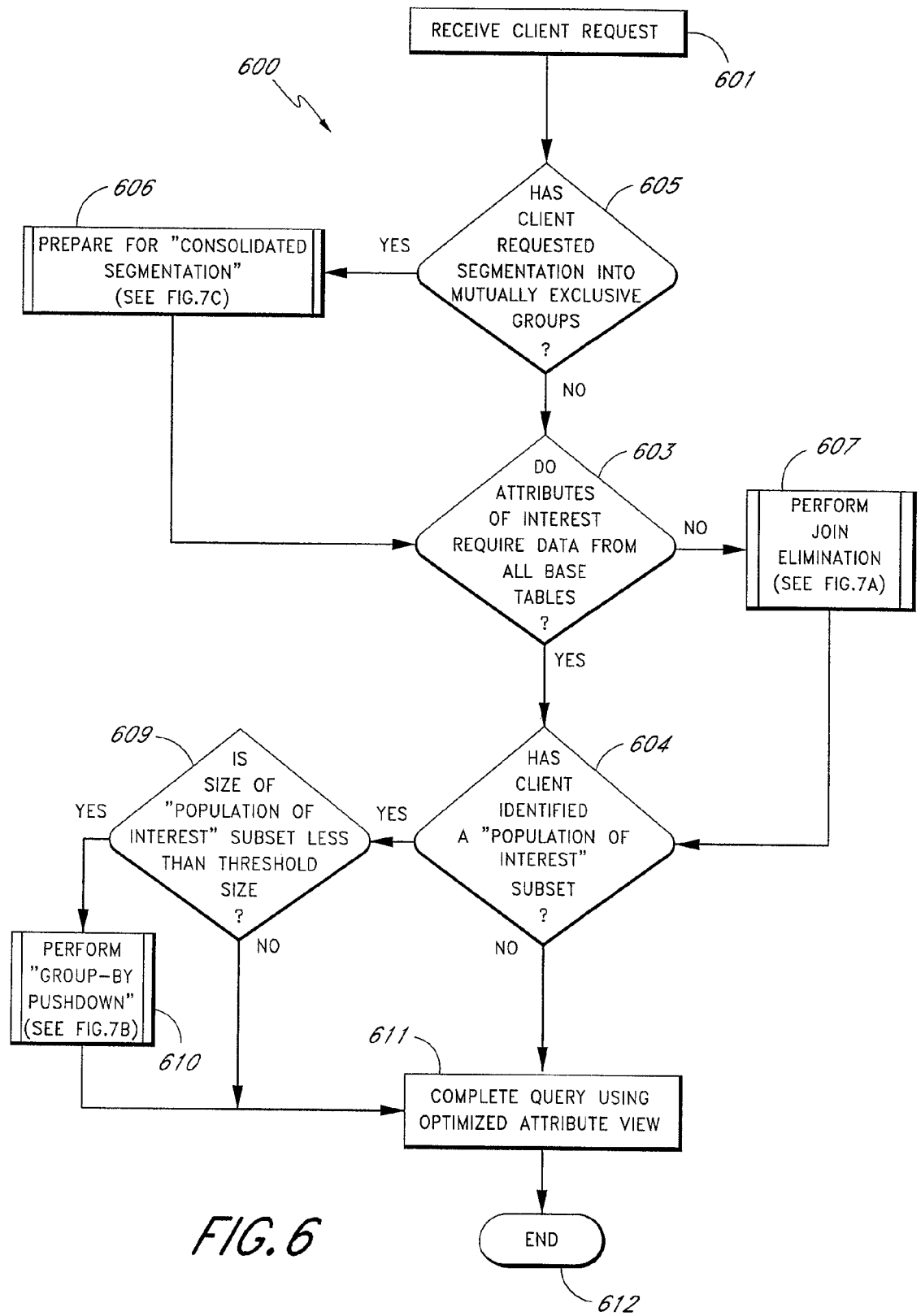
FIG. 6 is a flowchart depicting one embodiment of a process for processing a query including determining whether to use query optimizations.

FIG. 6 is a flowchart depicting one embodiment of a process 600 that may be executed in association with optimizing a batch query 160 and generating an associated application plan, as was described with reference to Blocks 502 and 504 of FIG. 5, including determining whether to use one or more of the query optimizations provided by the data warehouse system 150.

In Block 601, the batch query 160 is received by the query management system 200 as a request for information based on data that is stored in the data warehouse 150. Some requests for information specify a defined segment of the population and request certain types of information for the defined segment. The desired information may exist in the data warehouse 150 as one or more "attributes of interest" associated with the records of the attribute view 400. Some requests for information may specify a set of desired attributes, and may request additional information from records identified as including the desired set of attributes.

Some requests for information may request that all or a part of the records of the attribute view 400 be categorized and divided into groups based on attributes found in the records. These information requests may be posed as batch queries 160 to the data warehouse 150, relying on attributes of interest within the records of the attribute view 400 to successfully return the desired information.

As was described with reference to FIG. 4, in response to a query from the query management system 200, the data warehouse system 150 may access an attribute view definition that comprises information about each attribute in the attribute view 400, including information about any formulas used to calculate the attribute, about one or more base tables 310-315 that store data used to generate the attribute, and about any formatting, type, or range restrictions defined for the attribute.

In Block 605, in response to receiving a batch query 160, the query management system 200 determines if the request for information received from the client includes categorization, also known as segmentation, of the records into mutually exclusive categories. If the query management system 200 determines that segmentation into mutually exclusive groups is not part of the client's 130 request for information, the process continues at Block 603.

If the query management system 200 determines that the client 130 has requested segmentation into mutually exclusive groups, the process 600 continues in Block 606, where the segmentation query is written as a single query to the attribute view 400, as will be described in greater detail with reference to FIGS. 7C and 7D.

In Block 603, the data warehouse system 150 identifies the attributes of interest for this query and determines whether all or only some of the base tables 310-312 with bi-directional referential integrity (RI) that are used to form the consumer information view 410 are also used to calculate, derive, or otherwise retrieve the attributes of interest for this query. In general, a default definition of the consumer information view 410 may include instructions to execute inner join operations on the associated base tables 310-312. When the default version of the attribute view 400 is used for generating the attributes of interest, execution of the process 600 continues with Block 604.

However, if, in Block 603, the data warehouse system 150 identifies one or more of the base tables 310-312 with bi-directional RI that are not used for generating the attributes of interest for this query 160, execution of the process may continue in Block 607, where a "join elimination" optimization, as will be described in greater detail with reference to FIG. 7A, may be carried out that generates a modified version of the consumer information view 410 for generating the attribute view 400 and executing the query.

In Block 604, the data warehouse system 150 further determines whether the request for information includes a defined "sub-population of interest" for the query 160. For example, clients 130 may desire to receive information about a subset of the records, such as about consumers who live in a specific geographic area, rather than posing the query for an unlimited set of the records in the attribute view 400. In some instances, the client 130 may explicitly identify consumers in the "sub-population of interest," and may provide a list or temporary table structure for example, with the batch query 160. In other instances, the query management system 200 may identify the "sub-population of interest" as a pre-query operation, based on attributes of interest supplied by the client 130. If, in Block 604, the query management system 200 determines that no "sub-population of interest" has been identified, execution of the process 600 proceeds to Block 605.

If, however, a sub-population of interest has been defined, execution continues in Block 609, where the data warehouse system 150 determines if the "population of interest" subset is less than a pre-determined threshold size. As will be described in greater detail with reference to FIG. 7B, the threshold size may be defined in a number of ways, preferably with relation to the size of the database population as a whole.

If the data warehouse system 150 determines that the population of interest subset is greater than the threshold size, the process to optimize the information request 600 proceeds with normal execution in Block 605. If the data warehouse system 150 determines that the population of interest subset is less than the threshold size, execution of the process 600 continues in block 610, where a "Group-By Pushdown" optimization, also known as a "Join Pushdown Through Group-By" may be performed. The "Join Pushdown Through Group-By" optimization allows for generation of an optimized, abbreviated version of the attribute view 400 that is used for executing the batch query 160, and will be described in greater detail with reference to FIG. 7B.

Looking now at examples of the optimizations performed by the data warehouse system 150, three optimizations will be described in greater detail: Join Elimination, Join Pushdown Through Group-By, and Consolidated Segmentation. As each of these optimizations may be used independently from the others, it should be understood that the present invention does not require that any two or more of these optimizations be implemented or used in combination.

As was described in greater detail with reference to FIG. 4, a batch query 160 is typically executed against the attribute view 400. The attribute view 400 is a virtual table comprising a comprehensive set of attributes for each record, for example three thousand attributes, which include many derived attributes based on data from the base data tables 310-315. The attribute values are calculated dynamically upon receipt of a query, so that the data in the attribute view 400 is up-to-date.

In general, the attribute view 400 is generated, at least in part, by one or more left-outer join operations performed on the consumer information view 410 and the aggregated views 446, 456, 466 of the base tables 313, 314, 315. The attribute view 400 may thus include, for example, three thousand attributes for each of thirty million personal identification numbers (PIN) in the consumer table 310.

As was described above, join operations are very expensive with respect to system resources, in part because the result produced represents the Cartesian product of the tables being joined. When the tables being joined comprise tens of millions of records, each of which comprises thousands of attributes, managing temporary storage in memory, access, and manipulation of the data becomes extremely cumbersome. Furthermore, complex queries submitted by the query management system 200 may take many hours, or even more than a full day, to be completed, tying up system resources for the duration.

An aspect of the preferred embodiment involves the realization that, given appropriate conditions, which will be described below, an optimized application plan that may include one or more of: reduction of inner join operations, re-ordering of join and group-by operations, and consolidation of segmentation queries, as will be described with respect to the optimization descriptions below, may be implemented in response to a query. These optimizations, used individually or in combination, allow for greatly reduced consumption of system resources and greatly improved response time for batch queries 160.

Join Elimination

Figure 7A:
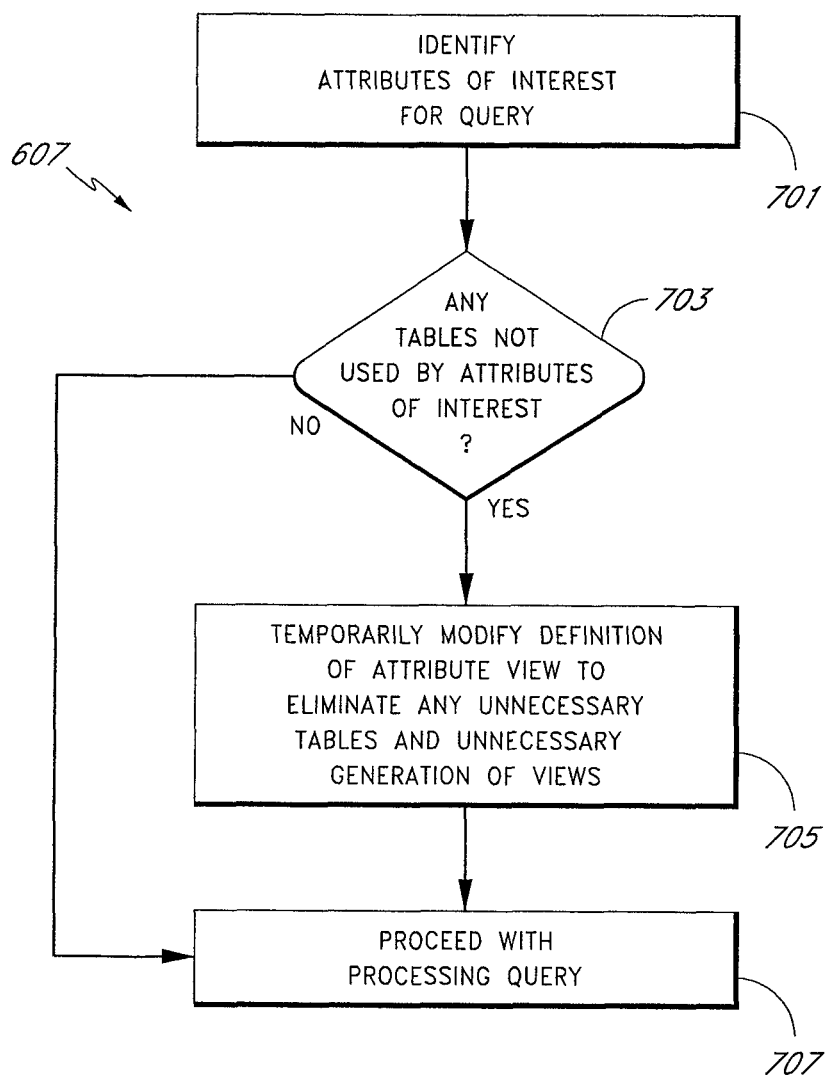
FIG. 7A is a flowchart depicting one embodiment of a process for executing a join elimination query optimization.

FIG. 7A is a flowchart, which expands on Block 607 of FIG. 6, depicting one embodiment of a process for executing a "join elimination" query optimization. Beginning in Block 701 of FIG. 7A, when a batch query 160 is received by the data warehouse system 150, the data warehouse system 150 identifies attributes of interest to the query from amongst the attributes available in the attribute view 400 and/or from amongst a set of user-defined custom attributes. For each attribute, an attribute definition provides information about a name used for the attribute, about a formula used for calculating the data value of the attribute, if applicable, and about one or more tables 310-315 from the database schema 300 and/or one or more views based on those tables 310-315 that are used for calculating the attribute. An attribute may be based on data from a single base data table 310-315 or may be based on more than one base table 310-315

As depicted by Block 703, the query management system 200 determines whether there are any base tables 313-315 in the database warehouse 150 whose data is not used to calculate or derive any of the "attributes of interest" identified by the batch query 160. If the query management system 200 determines that all base tables 310-315 of the system 150 are used for the query, then execution of the process 607 passes on to Block 707 where processing of the query proceeds as normal.

If the query management system 200 is able to identify one or more base tables 313-315 that are not used for any of the attributes of interest, execution of the process 607 passes to Block 705, where a modified definition of the attribute view 400 is generated and used for executing the query 160 in place of the normal attribute view 400. The modified attribute view 400 contains columns for the attributes of interest, but does not include columns for attributes whose values are based on data from the one or more identified base tables 313-315 and/or their associated views. As described above, this allows the data warehouse system 150 to avoid performing undesired calculations and also causes the resulting modified version of the attribute view 400 to take up significantly less space in memory while the query is being processed.

Once the modified version of the attribute view 400 is calculated, execution of the process moves on to Block 707, where processing of the query continues using the modified versions of the consumer information view 410 and the attribute view 400.

Join Pushdown Through Group-By

A "join pushdown through group-by" optimization, referenced in Block 610 of FIG. 6, may be implemented when the batch query processor 200 receives a query with a specified "population of interest." In the illustrated embodiment, this optimization is performed if the size of the population of interest is less than or equal to a threshold value with respect to the total population represented in the database. The threshold size is used to identify situations in which execution of the "join pushdown through group-by" optimization results in improved performance for query processing. If the population of interest is only slightly less than the entire population, then use of the default version of the attribute view 400 may be preferable.

In some embodiments, a threshold size that makes performance of the "join pushdown through group-by" desirable is expressed as a percentage of the size of a total population for which data is stored in the data warehouse 150. For example, if the population of interest is between the range of fifteen to thirty percent, or less, of the total population, then a group-by pushdown may be performed. In a preferred embodiment, the threshold size is twenty percent of the general population included in the records of the database 150. The threshold value may also be expressed as a number of consumers in the population of interest, for example five million or six million consumers, or by another method. Furthermore, the threshold value may be a variable quantity or percentage that is calculated based on one or more parameters.

As will be familiar to one of skill in the art, definition and use of the threshold may be accomplished in a variety of ways without departing from the spirit of the systems and methods described herein. For example, a comparison with a threshold percentage value may determine that the population of interest must be strictly less than the threshold percentage in order for the optimization to be activated. Alternatively, in other embodiments, the size of the population of interest may be less than or equal to the threshold percentage. These types of variations are implementation choices that may be made to suit the applications for which the systems and methods described herein are being used, and are considered within the scope of the systems and methods as defined in the applicable claims.

When threshold conditions have been met, the application plan of the query may include optimized generation of the attribute view 400. For the base tables 313-315 on which aggregated views 446, 456, 466 are generated using "group-by" operations, in the optimized version, one or more left-outer join operations between the population of interest and the base data tables 313-315 in question, are performed prior to generation of the aggregated views 446, 456, 466. The aforementioned left-outer join operations effectively reduce or "abbreviate" the base tables 310-315 to include only rows that pertain to the population of interest, as will be familiar to a practitioner of skill in the art. With a 20% threshold ratio, for example, the base tables 310-315 may thus be reduced to as little as 20% of their normal size.

Once the abbreviated base tables have been generated, the normal execution of the view for filters 445, 455, 465 and the aggregated views 446, 456, 466 may be carried out, using a significantly reduced amount of system resources.

Executing the join operations on the base tables 313-315 before calculation of the associated views can be seen as "pushing down" execution of the join operations to before or below that of the "group-by" operations that calculate the aggregated views 446, 456, 466. Using the abbreviated versions of the base tables to subsequently calculate an "abbreviated" set of aggregate views 446, 456, 466, and, in turn, an "abbreviated" attribute view 400 significantly reduces the memory space, processor time, and other system resources used for executing the query.

Figure 7B:
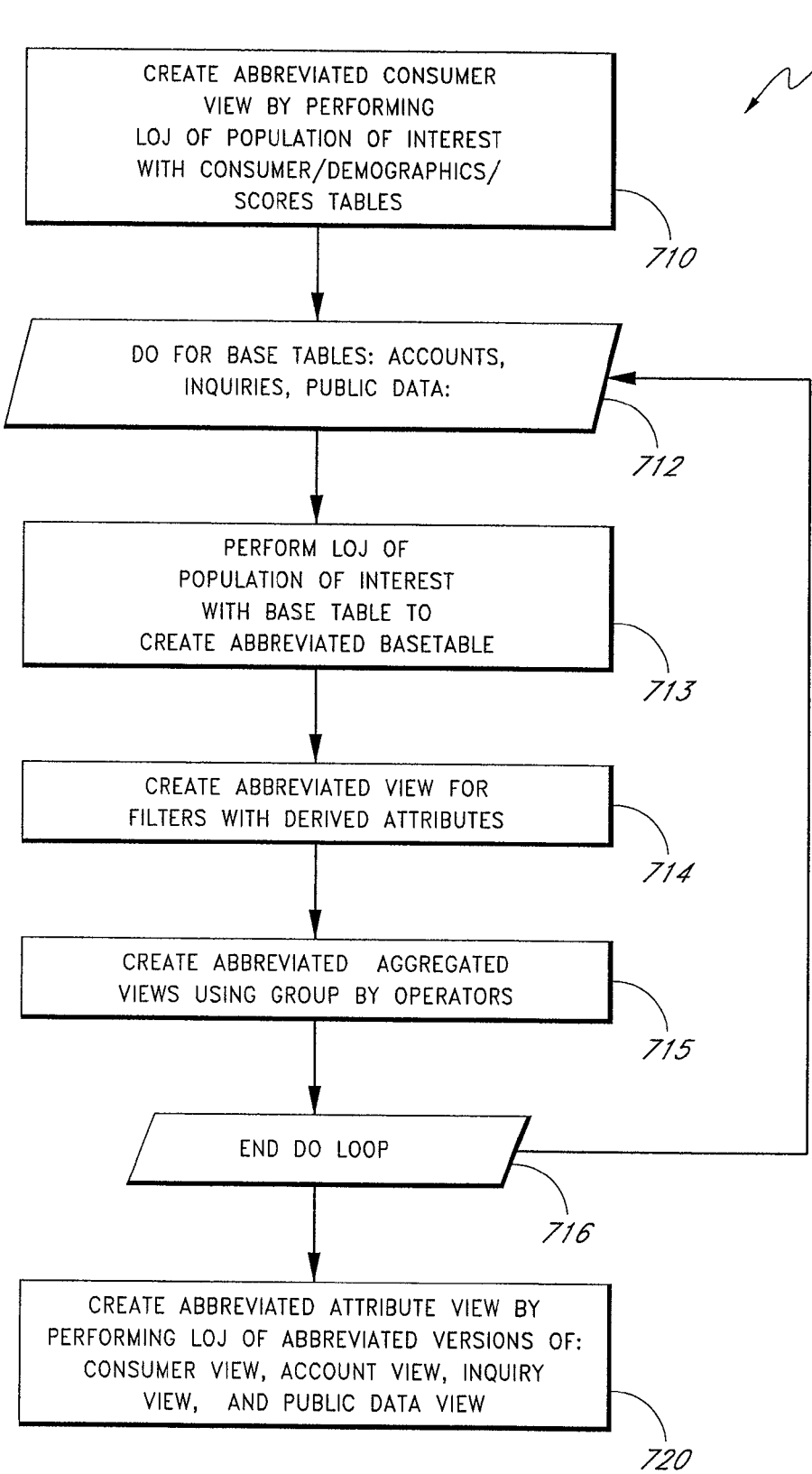
FIG. 7B is a flowchart depicting one embodiment of a process for executing a "join pushdown through group-by" query optimization.

A more detailed view of Block 610 from the flowchart of FIG. 6 is provided in the flowchart of FIG. 7B. According to the embodiment depicted in FIG. 7B, in Block 710, an abbreviated version of the consumer information view 410 is generated by performing left-outer join operations between a table comprising the population of interest and the consumer, demographics, and scores base tables 310-312, respectively. The abbreviated base tables 310-312 are then combined using inner join operations to generate the abbreviated version of the consumer information view 410. Alternatively, an abbreviated version of the consumer information view 410 may also be generated by calculating the data values for the consumer information view 410 normally, and then performing a left-outer join operation directly between the population of interest table and the consumer information view 410.

Beginning in Block 712, an instruction loop begins that generates, for each of the base tables 313-315, abbreviated versions of the associated aggregated views 446, 456, 466, which are then used to create an abbreviated version of the attribute view 400 for responding to the query 160. The loop operations begin in Block 713, where an abbreviated version of a base table is generated by performing a left-outer join operation between the population of interest table and the base table. The resulting abbreviated version of the base table now includes only rows that pertain to members of the population of interest.

In Block 714, the abbreviated base table is used to calculate an abbreviated version of the associated view for filters that includes derived attributes based on data in the base table. In Block 715, an abbreviated version of the associated aggregated view is generated by performing group-by operations on the data in the abbreviated versions of the associated base table and the view for filters. As with the normal version of the aggregated views, the abbreviated aggregated view includes one row per member of the population in the aggregated view. However, the abbreviated view includes rows only for members of the population of interest for the current query.

In Block 716, the process 610 determines if abbreviated versions of all base tables 313-315, all associated views for filters 445, 455, 465, and all associated aggregated views 446, 456, 466 have been generated. If all the aforementioned abbreviated tables and views have been created, execution moves on to Block 720. If not, the loop 712-716 is repeated for another base table and the associated views.

In Block 720, once abbreviated versions of the consumer information view 410 and of the aggregated views 446, 456, 466 are generated, these abbreviated views are joined to form an abbreviated attribute view 400 for use in answering the query 160.

Consolidated Segmentation

A batch query 160 processed by the query management system 200 may be formulated as a request to segment a population or a sub-population of interest into a plurality of segments, which can be seen as "buckets" into which the records associated with the members of the population are "deposited." For example, in a credit-related data warehouse system, a credit card provider may desire to have a population of consumers segmented, based on a series of complex credit-related criteria, into those who will be offered a "Platinum Credit Card," those who will be offered a "Gold Credit Card," those who will be offered a "Silver Credit Card," and those who will not be offered any credit card.

When the population is to be segmented into mutually exclusive "buckets," that is, when each member of the population is to be assigned to one and only one bucket, then a "consolidated segmentation," as referenced in Block 606 of FIG. 6, may be performed that may greatly reduce the time required to execute the segmentation query, as described below Reading and processing all the records (rows) in the attribute view 400 is an expensive operation in terms of processor resources and time, especially when the attribute view 400 includes tens of millions of records, but it is carried out when necessary for executing a query 160.

Figure 7C:
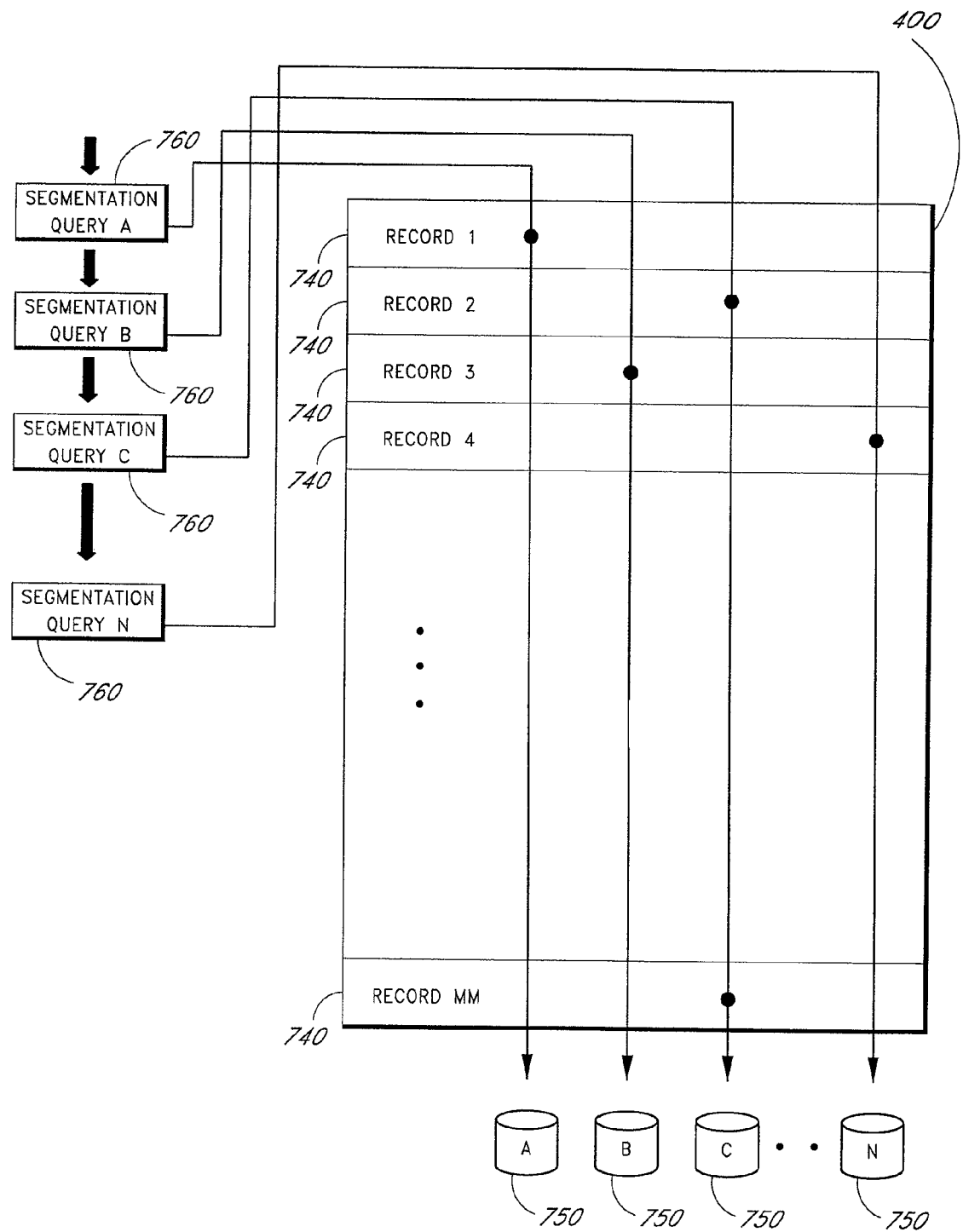
FIG. 7C is a block diagram depicting one embodiment of a non-consolidated segmentation process.
Figure 7D:
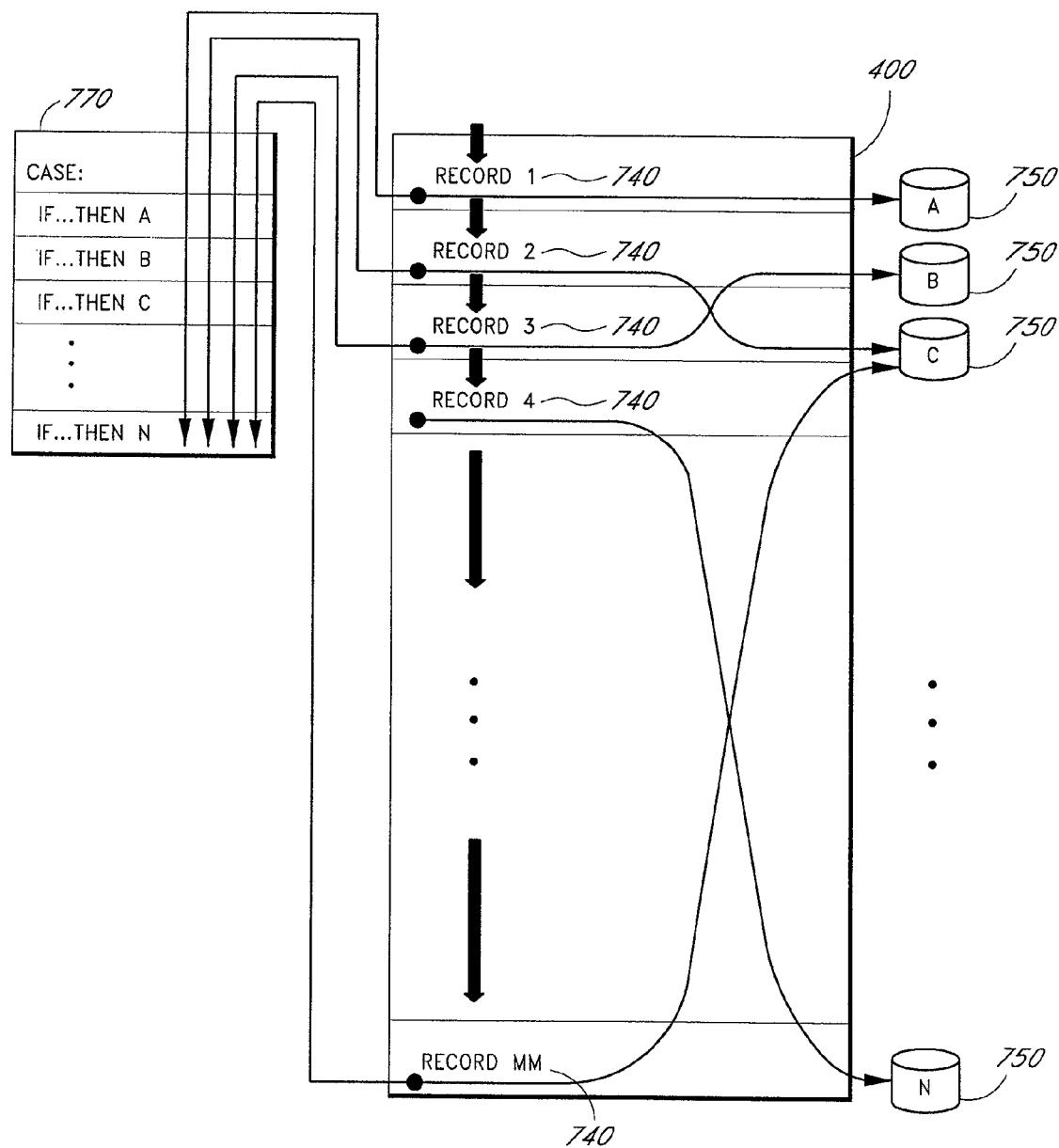
FIG. 7D is a block diagram depicting one embodiment of a query optimization that consolidates a set of segmentation operations.

FIG. 7D is a block diagram depicting one embodiment of a query optimization that consolidates a set of segmentation operations, while FIG. 7C depicts a non-consolidated segmentation process. As depicted in FIG. 7C, when segmentation is executed as separate code modules 760, each segmentation code module 760 describes the conditions under which a record 740 from the attribute view 400 is to be assigned to a given bucket 750. A first segmentation code module 760 is read, and then each record 740 of the attribute view 400, in turn, is read and processed to determine if the record 740 meets the conditions for being assigned to the current bucket 750, and if so, to assign it. When all of the records 740 of the attribute view 400 have been read with regard to a first bucket 750, a second segmentation code module 760 is read, and all of the records 740 of the attribute view 400 are re-read and processed to identify and assign appropriate records to the second bucket 750.

The process is described pictorially in FIG. 7C, in which a set of thick black arrows indicates execution of the segmentation queries 760. As each code segment 760 is read, the query management system 200 reads through all MM records of the attribute table 400, identifying those records 740 that meet the conditions specified in the code module 760 (indicated in FIG. 7C by a black dot). Thus, FIG. 7C indicates that the segmentation code for Bucket A identifies Record 1 as belonging in the bucket 750. Next, execution proceeds to code module B, and the records 740 of the attribute view 400 are read in full once again, this time identifying Record 3 as belonging in Bucket B. On the third pass through the records 740 of the attribute table 400, Record 2 and Record MM are identified as belonging in Bucket C, and so on.

Thus, if the set of segmentation code modules 740 define conditions for assignment to N buckets, and if the attribute view 400 includes MM records, all the records 740 of the attribute view 400, numbering MM (for example, thirty million records), are read N times, while the segmentation code modules 740, vastly smaller and less expensive to read than the attribute table 400, are each read one time.

As depicted in FIG. 7D, when the query management system 200 optimizes a set of segmentation queries 160, the individual segments identified are combined into a consolidated query 770. In a preferred embodiment, the consolidated query 770 is written as a CASE statement in a database query language, such as those of the SQL family of languages. For example, the consolidated query 770 may be written in the following format:

```
SELECT (attributes of interest)
(CASE
    WHEN (condition statement A about attributes of interest) THEN
PLAT_CARD
    WHEN (condition statement B about attributes of interest) THEN
GOLD_CARD
    WHEN (condition statement C about attributes of interest) THEN
SILVER_CARD
    ...
    ELSE NO_CARD) BUCKET
FROM attribute-view
```

Execution of the consolidated query 770 is described pictorially in FIG. 7D. Here, as each record 740 is read in turn, the consolidated query 770 is read to identify a bucket 750 to assign the record 740. Once the record 740 is assigned, execution of the segmentation query moves on to the next record 740, which is read (once) and then assigned a bucket 750, based on the consolidated query code 770. The process results in the same assignment of records 740 to buckets, but does so in only one pass through the records 740 of the attribute view 400. Although the segmentation code 770 is read once per record, namely MM times in the example of FIG. 7D, this set of read operations is far less consuming of processor time and other resources than are multiple reads of the massive attribute view 400 records. Furthermore, although the depiction in FIG. 7D indicates that the full segmentation query 770 is read in full for each record 740 that is being assigned a bucket 750, in some embodiments, reading of the segmentation code 770 stops when bucket conditions matching those in a record and the record 740 is assigned. Thus, only when a record 740 is assigned to the last bucket defined in the code 770 does the read operation continue all the way through the entire segmentation code module 770. However, even if every read through the code results in a read through the entire consolidated segmentation code module, the consolidated segmentation query still represents a significant improvement in query processing performance.

As will be easily understood by a practitioner of skill in the art, "buckets" do not physically exist the data warehouse system 150, but are an abstraction used to illustrate the concept of segmenting a set of records 740. In a preferred embodiment, the output of the consolidated query 760 is a table with at least one column identifying the record 740, such as by PIN number, and including any other useful information, such as name and contact information associated with the record, for example, in the case of a segmentation query for a credit card offer campaign. The output of the consolidated query 760 also includes a column with information about the "bucket" or segment to which the record has been assigned. In some embodiments, the output records may be sorted to list all records assigned to a given bucket together for ease of use. Thus, a very simplified version of the output for the query depicted in FIGS. 7C and 7D could be presented as follows:

| PIN | BUCKET |
|-----|--------|
| 1   | A      |
| 3   | B      |
| 2   | C      |
| MM  | C      |
| ... | ...    |
| 4   | N      |

Using the consolidated segmentation query 770, each record 740 of the attribute view 400 is read once. The segmentation code 750 may be read once per record 740, but since the segmentation code 750 is far smaller than the attribute table 400, which may include, for example, thirty million records, each having over three thousand attributes, reading and re-reading the segmentation code 750 is a much less expensive operation than reading and re-reading the attribute table 400 from a computer-processing point of view.

A data warehouse system with optimization capabilities has been described that allows for greatly enhanced performance of batch queries executed on the system 150. The query optimizations generate modified and/or abbreviated versions of an attribute view 400 that provides comprehensive access to information based on data stored in the data warehouse 150 and/or by transform segmentation requests that meet certain criteria into a consolidated segmentation queries for running on the attribute view 400. These query optimizations may be implemented individually or in combination with a given data warehouse system.

Although simple examples have been provided to explain aspects of the system, using an embodiment that implements a massive consumer credit-related database system, other applications, both finance-related and non-finance-related, also benefit from the optimizations described herein. Furthermore, sample schemas and other types of system and data organization have been offered as examples for purposes of illustration. However, other schemas, other table and view definitions, and other methods of implementing the query optimizations described herein are contemplated, without going beyond the scope of the invention. For example, although examples provided in this specification have described a system in which records (rows) refer to individual consumers, and in which batch query results 265 typically comprise information about individuals consumers, in other embodiments, the data stored is credit-related data for households. Furthermore, in other embodiments, the data stored is credit-related and may be accessed for information about individuals and/or households.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims, as now presented and as may be amended or otherwise supplemented in the future, are intended to cover such forms or modifications as would fall within the scope and spirit of the invention.

What is claimed is:

1. A method of dynamically revising a query before processing by a relational database, the method comprising:

receiving, with a query management system, a query comprising one or more attributes, each of the one or more attributes related to data stored in two or more base tables of a relational database;

accessing, with the query management system, an attribute view definition that defines an attribute view, the attribute view definition referencing a plurality of base tables of the relational database, including the two or more base tables, wherein the attribute view definition references more base tables than necessary for deriving the one or more attributes comprised in the query, wherein the one or more attributes in the query are a subset of attributes available in the attribute view;

identifying, with the query management system, the one or more attributes in the query, wherein the identified one or more attributes are the one or more attributes in the query;

determining, with the query management system, a set of unreferenced base tables from the plurality of base tables, wherein the unreferenced base tables do not store data used for calculating the one or more attributes of interest, wherein the accessing is performed prior to the determining;

generating, with the query management system, a modified definition of the attribute view definition, the modified definition defining a temporary attribute view for processing the query, the modified definition excludes references to the set of unreferenced base tables; and electronically submitting, with the query management system, the query to the relational database for generation of the temporary attribute view using the modified definition and for execution of the query on the temporary attribute view, wherein the query management system comprises a computer processor and an electronic memory storage.

2. The method of claim 1, wherein the one or more attributes of the query comprises at least one derived attribute that is calculated from at least one attribute using at least one of the base tables.

3. The method of claim 1, wherein at least a portion of one of the base data tables stores data related to at least one of: credit accounts, credit inquiries or property-related public data records.

4. The method of claim 2, wherein the at least one derived attribute is calculated in real time in response to receiving the query.

5. The method of claim 1, wherein the query is a batch query.

6. A query management system with query optimization capabilities, the query management system comprising:
   one or more computer processors;
   a computer readable electronic memory storage in communication with the one or more computer processors, the computer readable electronic memory storage storing software modules including instructions that are executable by the one or more hardware processors, the software modules including at least:
   a query processing module configured to:
      electronically communicate with a database warehouse system which logically stores data about a general population as a plurality of base data tables;
      a query comprising one more attributes, each of the one or more attributes related to data stored in one or more base data tables of the plurality of base data tables;
      access a virtual table definition that defines a virtual table, the virtual table definition referencing a subset of the plurality of base data tables, wherein the virtual table definition references more base data tables than necessary for deriving the one or more attributes comprised in the query, and wherein the one or more attributes in the query are a subset of attributes available in the virtual table;
      identify the one or more attributes in the query, wherein the identified one or more attributes are the one or more attributes in the query;
      determine, after the accessing of the virtual table definition, a set of unreferenced base data tables from the subset of the plurality of base data tables, wherein the unreferenced base data tables do not store data used for calculating the one or more attributes in the query;
      generates a modified definition of the virtual table definition, the modified definition defining a temporary virtual table for processing the query and excluding references to the set of unreferenced base data tables; and
         electronically submit the query to the database warehouse system for generation of the temporary virtual table using the modified definition and for execution of the query using the temporary virtual table.

7. The query management system of claim 6, wherein the database warehouse system is a relational database system.

8. The query management system of claim 6, wherein the one or more attributes of the query comprises at least one derived attribute that is calculated from at least one attribute using at least one of the plurality of base data tables.

9. The query management system of claim 6, wherein at least a portion of one of the base data tables stores data related to at least one of: credit accounts, credit inquiries, or property-related public data records.

10. The query management system of claim 8, wherein the at least one derived attribute is calculated in real time in response to receiving the query.

11. The query management system of claim 6, wherein the query is a batch query.

12. Non-transitory computer storage that stores executable program instructions that direct a computer system to at least:
   receive a query comprising one or more attributes, each of the one or more attributes related to data stored in two or more base tables of a relational database;
   access an attribute view definition that defines an attribute view, the attribute view definition referencing a plurality of base tables of the relational database, including the two or more base tables, wherein the attribute view definition references more base tables than necessary for deriving the one or more attributes comprised in the query, wherein the one or more attributes in the query are a subset of attributes available in the attribute view;
   identify the one or more attributes in the query, wherein the identified one or more attributes are the one or more attributes in the query;
   determine a set of unreferenced base tables of from the plurality of base tables, wherein the unreferenced base tables do not store data used for calculating the one or more attributes of interest, wherein the accessing is performed prior to the determining;
   generate a modified definition of the attribute view definition, the modified definition defining a temporary attribute view for processing the query, the modified definition excludes references to the set of unreferenced base tables; and
   electronically submit the query to the relational database for generation of the temporary attribute view using the modified definition and for execution of the query on the temporary attribute view.

13. The non-transitory computer storage of claim 12, wherein the one or more attributes of the query comprises at least one derived attribute that is calculated from at least one attribute using at least one of the base tables.

14. The non-transitory computer storage of claim 12, wherein at least a portion of one of the base data tables stores data related to at least one of: credit accounts, credit inquiries or property-related public data records.

15. The non-transitory computer storage of claim 12, wherein the at least one derived attribute is calculated in real time in response to receiving the query.

16. The non-transitory computer storage of claim 12, wherein the query is a batch query.

* * * * *

UNITED STATES PATENT AND TRADEMARK OFFICE
CERTIFICATE OF CORRECTION

PATENT NO. : 8,583,593 B1
APPLICATION NO. : 13/300414
DATED : November 12, 2013
INVENTOR(S) : Achanta Page 1 of 1

It is certified that error appears in the above-identified patent and that said Letters Patent is hereby corrected as shown below:

On the Title Page
In column 2 (page 3, item 56) at line 20, Under Other Publications, change "Ficticious" to --Fictitious--.

In the Specification
In column 3 at line 15, After "results" insert --.--.
In column 8 at line 43, Change "give" to --given--.
In column 10 at line 40, Change "more that" to --more than--.
In column 15 at line 17, After "310-315" insert --.--.
In column 17 at line 50, After "below" insert --.--.

In the Claims
In column 21 at line 23, In Claim 6, change "a" to --receive a--.

Signed and Sealed this
Third Day of June, 2014

Michelle K. Lee
*Deputy Director of the United States Patent and Trademark Office*